US 11,642,999 B2
May 9, 2023

(12) United States Patent
Ulsamer et al.

(54) DELIVERY VEHICLE WITH UNLOADING ARM

(71) Applicant: Dianomix Inc., Calgary (CA)

(72) Inventors: Marius Ulsamer, Calgary (CA); Romeo Arvinte, Laval (CA)

(73) Assignee: DIANOMIX INC., Calgary (CA)

( * ) Notice: Subject to any disclaimer, the term of this patent is extended or adjusted under 35 U.S.C. 154(b) by 21 days.

(21) Appl. No.: 17/489,148

(22) Filed: Sep. 29, 2021

(65) Prior Publication Data

US 2022/0097588 A1    Mar. 31, 2022

Related U.S. Application Data

(60) Provisional application No. 63/084,673, filed on Sep. 29, 2020.

(51) Int. Cl.
*B60P 1/48*    (2006.01)
*B60P 3/00*    (2006.01)
(Continued)

(52) U.S. Cl.
CPC ............ *B60P 1/483* (2013.01); *B60P 1/5414* (2013.01); *B60P 3/007* (2013.01); *B66C 23/46* (2013.01); *B66F 9/063* (2013.01); *B60P 1/6463* (2013.01)

(58) Field of Classification Search
CPC ......... B60P 1/48; B60P 1/5414; B60P 1/5428; B60P 1/549; B60P 3/007; B65G 1/0457; B66C 23/46; B66F 9/063; B66F 9/065
See application file for complete search history.

(56) References Cited

U.S. PATENT DOCUMENTS 3,834,568 A * 9/1974 Larson ...................... B60P 1/48
414/458
4,236,861 A * 12/1980 Grove ...................... B60P 1/48
414/745.7
(Continued)

FOREIGN PATENT DOCUMENTS

CN      106965886        7/2017
DE   102018211567 A1 *  1/2020  ............. B60P 3/007
(Continued)

OTHER PUBLICATIONS

Espacenet translation of JP2021070090A Robot; Toyota Motor Corp; Inoue Shunji, et al.
(Continued)

*Primary Examiner* — James Keenan
(74) *Attorney, Agent, or Firm* — Parlee McLaws, LLP

(57) ABSTRACT

The disclosure provides a delivery vehicle. The delivery vehicle may be automated for delivering one or more containers to a delivery location and unloading the one or more containers at that location. The vehicle includes a vehicle body defining a bay therein. The vehicle also includes a plurality of container hangers mounted within the bay and an automated unloading arm movable between a retracted arm position and an extended arm position. The arm is at least partially received in the bay in the retracted arm position and extends from the body in the extended arm position. The unloading arm comprises at least one container carrying member, such as at least one hook, longitudinally movable along the unloading arm for selective longitudinal alignment with each of the plurality of hangers.

19 Claims, 23 Drawing Sheets

(51) Int. Cl.
 B66C 23/46 (2006.01)
 B66F 9/06 (2006.01)
 B60P 1/54 (2006.01)
 B60P 1/64 (2006.01)

(56) References Cited

U.S. PATENT DOCUMENTS

| | | | | |
|---|---|---|---|---|
| 5,156,513 A | * | 10/1992 | Galan | B65G 1/0457 |
| | | | | 414/280 |
| 5,211,523 A | * | 5/1993 | Andrada Galan | B66F 9/063 |
| | | | | 414/280 |
| 10,017,094 B2 | * | 7/2018 | Blanchard | B60P 1/5433 |
| 10,793,353 B2 | * | 10/2020 | Nakano | B66F 9/06 |
| 2019/0241298 A1 | | 8/2019 | Brooks et al. | |

FOREIGN PATENT DOCUMENTS

| | | | | | |
|---|---|---|---|---|---|
| GB | 2568768 A | * | 5/2019 | | B60P 3/007 |
| JP | 2021070090 | | 5/2021 | | |
| WO | WO-9104931 A1 | * | 4/1991 | | B65G 1/0457 |

OTHER PUBLICATIONS

Espacenet translation of CN106965886A Novel separable express delivery vehicle; Top-Tri Group Consultants Co Ltd; Ma Kaimin.

* cited by examiner

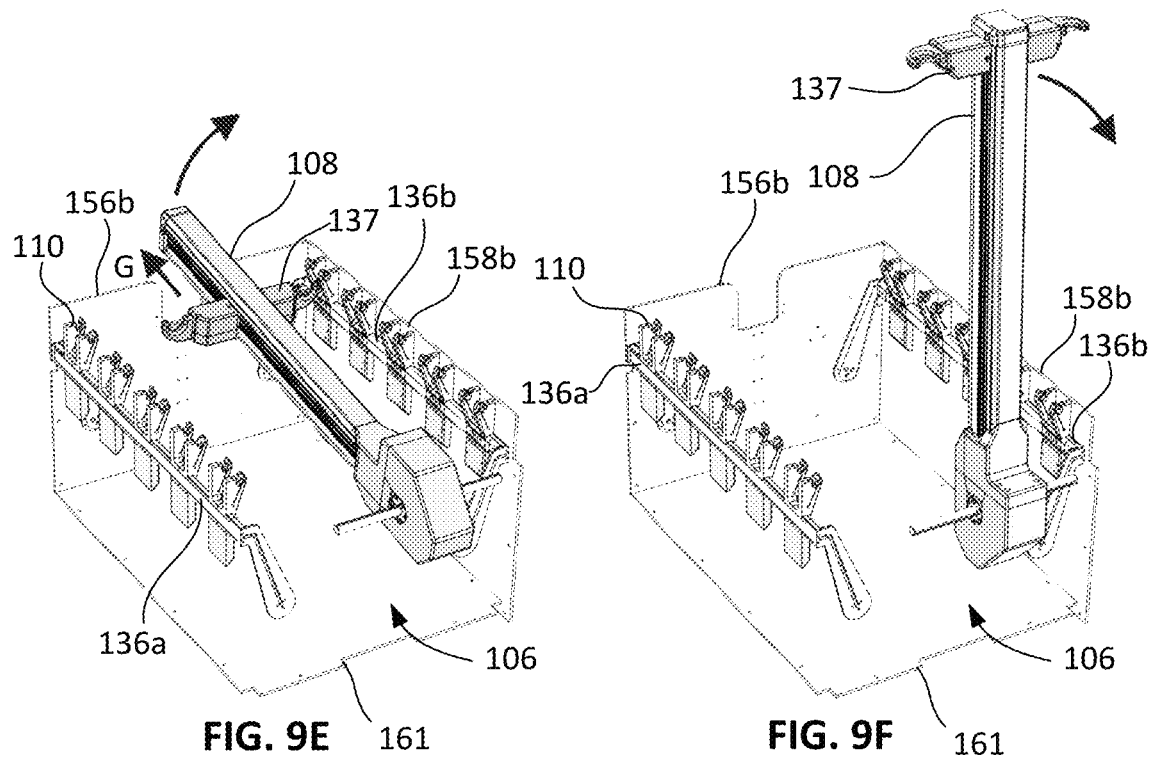
FIG. 9E
FIG. 9F
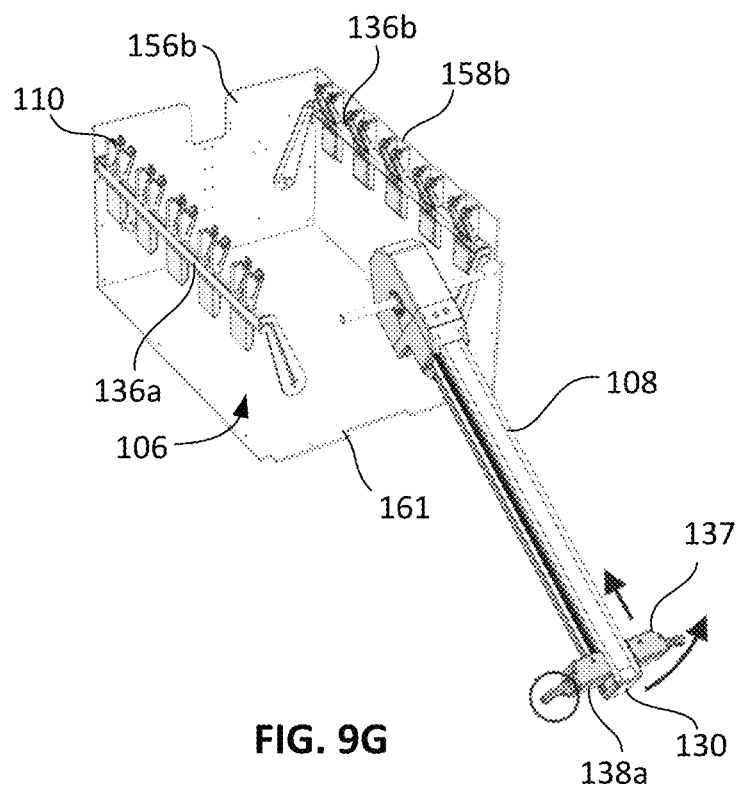
FIG. 9G

DELIVERY VEHICLE WITH UNLOADING ARM

RELATED APPLICATION

The present application claims priority to U.S. Provisional Patent Application No. 63/084,673, filed Sep. 29, 2020, the entire disclosure of which is incorporated herein by reference.

FIELD OF THE DISCLOSURE

The present disclosure relates to vehicles and systems for delivery of goods from a first location to a second location. More particularly, the disclosure relates to automated delivery vehicles.

BACKGROUND

Delivery of products to fulfill a customer order typically includes multiple steps in the delivery process. For example, when an order is placed for a product, the product may be located in a warehouse, where it is then packed and shipped. The overall shipping route may include multiple segments between transportation hubs. The final leg of the delivery, which is typically from a transportation hub to the customer's delivery address, may commonly be referred to as "last mile delivery."

Last mile delivery may be subject to various problems or difficulties. For example, last mile delivery systems may typically be implemented with vehicles manned by delivery workers. Such human-based delivery systems may be expensive and unsustainable for retailers. During a pandemic or other health crisis, interactions between delivery persons and customers may be difficult while maintaining physical distancing measures. With the increase of social distancing and remote working, there has been a rising demand from shoppers for quick home deliveries of various products. At the same time, shoppers may be sensitive to delivery fees. Retailers may want to retain customer base and loyalty. Thus, there exists a need for improved delivery vehicles and systems.

SUMMARY

According to an aspect, there is provided a delivery vehicle comprising: a vehicle body, the body defining a bay therein; a plurality of container hangers mounted within the bay; an unloading arm movable between a retracted arm position and an extended arm position, the arm being at least partially received in the bay in the retracted arm position and extending from the body in the extended arm position; and the unloading arm comprising at least one container carrying member longitudinally movable along the unloading arm for selective longitudinal alignment with each of the plurality of hangers.

In some embodiments, the arm is pivotably connected to the body of the vehicle and rotates about a pivot axis between the retracted arm position and the extended arm position.

In some embodiments, the arm rotates in a vertical plane between the retracted arm position and the extended arm position.

In some embodiments, the at least one container carrying member comprises at least one hook for engaging and lifting a container hung from one of the one or more hangers.

In some embodiments, the unloading arm comprises an arm member and a hook carriage mounted on the arm member and longitudinally movable along the arm member, and the at least one hook extends from the hook carriage.

In some embodiments, the vehicle further comprises a longitudinal actuation mechanism coupled to the hook carriage, the longitudinal actuation mechanism actuating longitudinal movement of the hook carriage along the arm member.

In some embodiments, the longitudinal actuation mechanism comprises a ball screw mechanism.

In some embodiments, the hook carriage comprises first and second carriage sections, each carriage section being positioned on a respective side of the unloading arm, the one or more hooks comprising a first hook extending from the first carriage section and a second hook extending from the second carriage section.

In some embodiments, each carriage section comprises a respective extendable and retractable pin, and the pin, when extended, extends across a gap defined by the respective hook.

In some embodiments, the plurality of hangers is arranged in first and second rows of hangers, and when the unloading arm is in the retracted arm position: the unloading arm extends between the first and second rows of hangers; and the first and second rows of hangers are each substantially parallel to the unloading arm with each row positioned to a respective side of the unloading arm.

In some embodiments, the first row of hangers is mounted on a first hanger frame and the second row of hangers is mounted on a second hanger frame, each of the first and second hanger frames being movable between a first frame position and an second frame position.

In some embodiments, for each of the first and second hanger frames, the extended frame position laterally aligns the hangers on the hanger frame with the respective hook of the carriage section on the respective side of the unloading arm In some embodiments, for each of the first and second hanger frames, the retracted frame position provides clearance for longitudinal movement of the hook carriage.

In some embodiments, the first and second carriage sections are each laterally extendable and retractable, the first carriage section extending to laterally align the first hook with the hangers of the first row, and second carriage section extending to laterally align the second hook with the hangers of the second row.

In some embodiments, the first row of hangers is mounted on a first sidewall of the bay, and the second row of hangers is mounted on a second sidewall of the bay.

In some embodiments, the vehicle further comprises bay doors movable between closed and opened positions, wherein, in the closed position, the bay doors cover an upper opening of the bay, and in the opened position, the bay doors are positioned adjacent the body.

In some embodiments, the vehicle further comprises at least one electronic identification reader for reading an electronic identification device.

In some embodiments, the at least one electronic identification reader comprises a plurality of readers, each reader associated with a respective one of the plurality of hangers.

In some embodiments, the vehicle further comprises a wireless communication module for communication with a remote computing device over a wireless communication network.

In some embodiments, the vehicle further comprises a control system operative to control the unloading arm.

In some embodiments, the vehicle further comprises a plurality of motor-driven wheels, wherein the control system is operative to control the wheels.

According to another aspect, there is provided a system comprising: at least one vehicle as described herein; and at least one remote computing device in communication with the at least one vehicle, the remote computing device sending signals to the vehicle to control at least one of navigation and unloading of the vehicle.

According to another aspect, there is provided a method for a delivery vehicle comprising body and a bay within the body, the method comprising: pivotably coupling an unloading arm to the vehicle body such that the unloading arm is rotatable between a retracted arm position and an extended arm position, the arm being at least partially received in the bay in the retracted arm position and extending from the body in the extended arm position; mounting a plurality of hangers in the bay, wherein the unloading arm comprises at least one container carrying member longitudinally movable along the unloading arm for selective longitudinal alignment with each of the plurality of hangers.

According to another aspect, there is provided a vehicle for delivery of one or more containers to a delivery location, the vehicle comprising: a vehicle body, the body comprising a bay therein for carrying at least one container; at least one driven wheel for forward and/or reverse motion; and a rear wheel assembly, the rear wheel assembly comprising at least one rear wheel pivotable about a vertical axis, and a motor for actuating pivoting of the wheel about the vertical axis, the vehicle body being supported by the at least one driven wheel and the rear wheel assembly.

In some embodiments, the at least one driven wheel comprises first and second driven wheels, the first and second driven wheels being individually and selectively drivable with a speed differential between the first and second wheels to enable differential steering.

In some embodiments, the motor is coupled to a processor, the processor controlling the motor to rotate the at least one rear wheel about the vertical axis to the orientation required by the current turning radius.

In some embodiments, the unloading arm further comprises further comprising, for each container carrying member, a container retaining mechanism operably to releasably secure a container to the container carrying member Other aspects and features of the present disclosure will become apparent to those ordinarily skilled in the art, upon review of the following description of the specific embodiments of the disclosure.

BRIEF DESCRIPTION OF THE DRAWINGS

The present disclosure will be better understood having regard to the drawings in which:

FIGS. 9A to 9H are perspective views of the unloading arm and bay of the vehicle of FIGS. 1 to 6, illustrating movement of the unloading arm for through an example unloading process;

DETAILED DESCRIPTION

Figure 1:
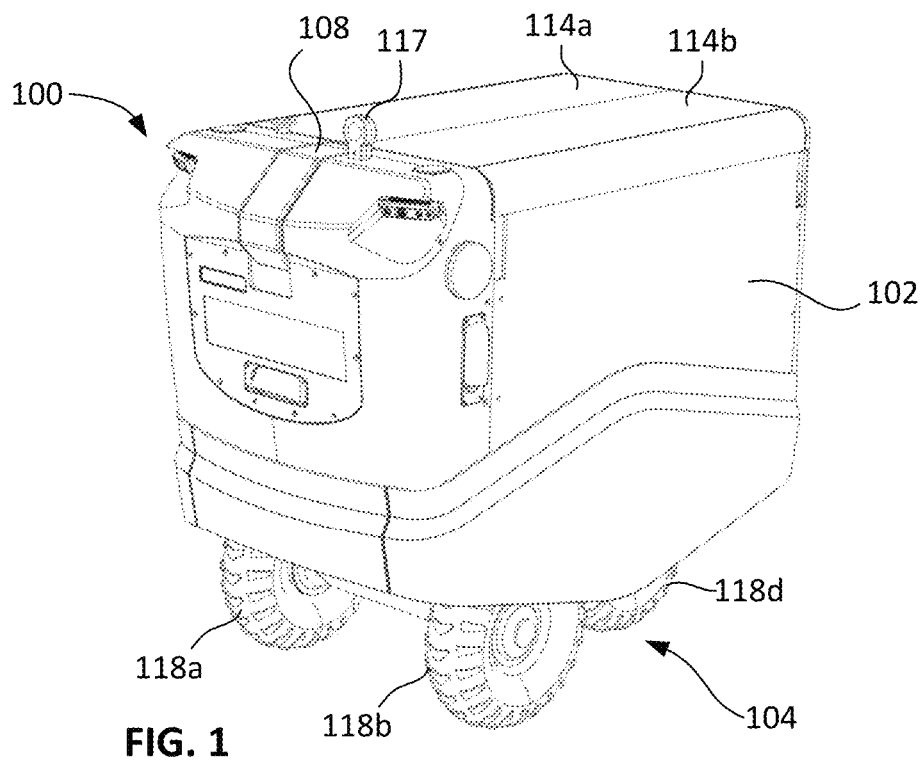
FIG. 1 is a front perspective of a delivery vehicle according to some embodiments, with bay doors closed and an unloading arm in a retracted position.

Aspects of the present disclosure include systems, vehicles and methods that may be particularly suited for last mile delivery. However, embodiments are not specifically limited to last mile delivery and may be used in any situation where goods are to be transported from a first location to a second location. For example, in addition to transporting goods to a customer's delivery address, the vehicles described herein may pick up goods from a storage location in a warehouse and deliver those good to a packing location in the same warehouse or a different building. The systems and/or vehicles may be at least partially automated. Embodiments are not limited to a particular delivery application.

Directional and orientation terms such as "front," "rear," "upward," "downward," "forward," "reverse," "above," "below" and the like are used for ease of description herein and do not necessarily limit the orientation of the vehicles or components thereof during use. It is also to be understood that terms including "vertical," "horizontal," and the like are not intended to require exact vertical or horizontal orientations. Elements that may be substantially or generally horizontal or vertical may simply be referred to as vertical or horizontal herein.

The delivery vehicles, systems, and methods disclosed herein may allow for convenient transport and unloading of goods. The term "delivery vehicle" as used herein may refer to any machine for configured for carrying or transporting cargo to a location for delivery. Embodiments are not necessarily limited to wheeled or ground vehicles.

The vehicle according to some embodiments may navigate between pickup and delivery locations. The vehicle includes a bay with hangers therein for hanging cargo such as bags (or other containers) of goods. The term "container" as used herein may refer to any structure for holding or storing cargo during transport, such as bags, boxes, and the like. For example, the cargo being transported may be groceries, and the container may be a grocery bag.

The vehicle includes an unloading arm that may selectively unload the bags. Unloading may include a combination of rotation of the arm and longitudinal adjustment of one or more container carrying members, such as hooks, along the length of the arm. Embodiments may include a single loading arm with arm hooks on either side of the arm to allow engagement with bags hung on both sides of the bay. This single-arm design may enable simple unloading with less maintenance and potentially less likelihood of mechanical error. Multiple unloading arms may be used in other embodiments. Other embodiments may include multiple unloading arms.

The vehicle may include bay doors that have a closed position, blocking access to the bay, and an opened position allowing access to the bay. In the opened position, the doors may be a positioned against outer sides of the body of the vehicle. This door arrangement may facilitate loading and unloading.

The vehicle may include a plurality of wheels for driving and steering the vehicle. The plurality of wheels may include a caster-type wheel assembly for steering the vehicle, which may be referred to herein as a 'rear wheel assembly'. The rear wheel assembly may be mounted near a rear of the vehicle and rotatable about a vertical axis to steer the vehicle. However, embodiments are not limited to this particular arrangement of wheels or method of steering the vehicle.

The vehicle may be self-driving using artificial intelligence (AI) driving software. The vehicle may automatically navigate to delivery locations and unload selected bags at said locations. The navigation may include route optimization calculations by the vehicle and/or a backend control system such as a remote server.

The bags (or other containers) transported by the vehicle may include electronic identification means, such as Radio-Frequency Identification (RFID) tags, that are scanned by the vehicle. The hangers in the bay may have associated RFID readers for said scanning. Thus, the location and ID of the bags in the bay of the vehicle may be known by the vehicle, and the vehicle may use the unloading arm to select and unload the correct bag(s) at a delivery location.

The vehicle may be in communication with a backend control system, such as a server or other remote computer system. The vehicle may communicate with the server over a wireless communication network. The server may maintain a database tracking orders, vehicle and bag ID information and/or location. The server may send control signals to the vehicle, including signals to control navigation and/or unloading of the vehicles. The server may also direct loading of the vehicle. Human operators may also monitor and control the vehicles through use of user interface devices on the vehicle and/or remotely through a computer system (over the wireless communication network).

In the drawings, stippled lines and/or partial transparency are used for illustrative purposes to represent elements that may normally be hidden behind other elements in that view.

Figure 2:
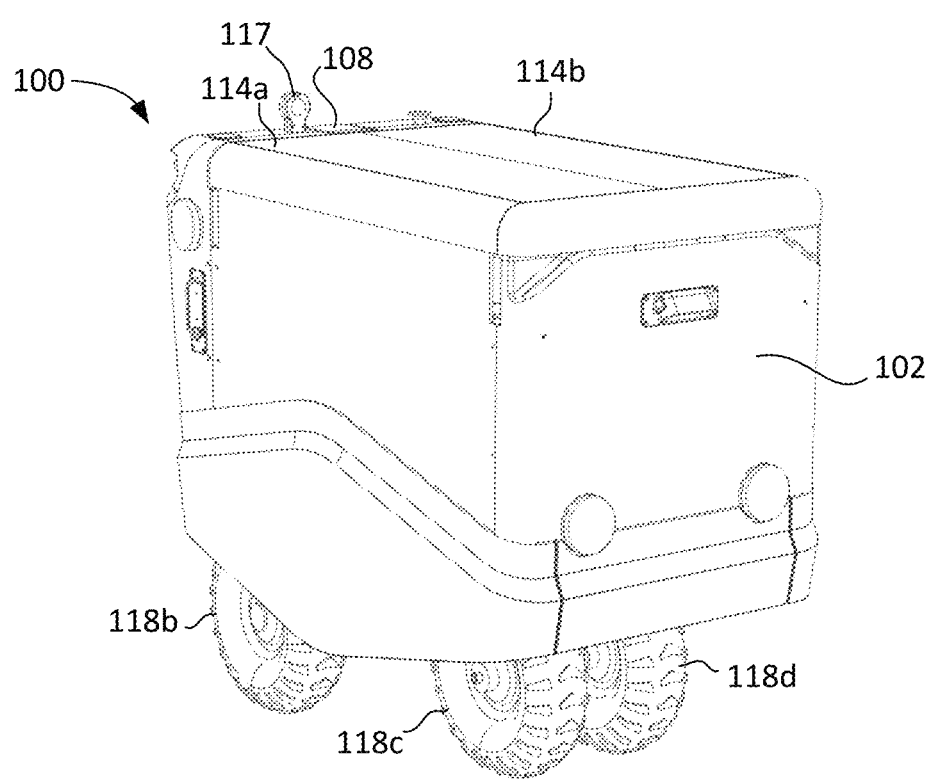
FIG. 2 is a rear perspective view of the vehicle of FIG. 1.

FIGS. 1 to 6 illustrate an example of an automated delivery vehicle 100 according to some embodiments. FIGS. 1 and 2 are front and rear perspective view of the vehicle 100 in a navigation configuration. The size of the vehicle may vary, but in some embodiments, the vehicle may be sized for convenient driving on a sidewalk, ramp, and/or hallway. By way of example, the vehicle may be approximately 1 meter long, 70 cm wide, and 1 meter high. However, embodiments are not limited to a particular size.

The vehicle 100 may be at least partially automated in that it may: (1) have self-driving capability and may automatically navigate to a delivery location and/or; (2) unload selected bags at the delivery location. The vehicle 100 may also be configured for manual and/or remote control by a human operator. The vehicle 100 may be used for delivery of goods, such as last mile delivery from a transportation hub to a delivery address. As will also be explained herein, the vehicle 100 includes structural and operational features that may enable efficient loading, delivery, tracking and unloading of bags containing goods to fulfill customer orders.

The vehicle 100 comprises a vehicle body 102 supported on locomotion means 104, an internal bay 106 (visible in FIGS. 3 and 4) within the body 102 for storing and/or carrying one or more containers of goods (such as bags) for transport, and an unloading arm 108 for unloading the containers from the bay 106. The unloading arm 108 is automated in this example, in that it is actuated and controlled by the vehicle 100. The bay 106 may be referred to as a "cargo bay." The vehicle 100 in this embodiment further comprises a plurality of container hangers 110 (visible in FIGS. 3 and 4) In this example, the vehicle 100 also comprises bay doors 114a and 114b or other closure means for covering an upper opening 122 of the bay 106 during transport. The bay doors 114a and 114b are shown closed in FIGS. 1 and 2, with the unloading arm 108 retracted inside the bay 106 and not visible.

The locomotion means 104 in this embodiment comprises a plurality of wheels 118a to 118d. At least one of the wheels 118a to 118d may be motor-driven to drive locomotion of the vehicle 100. For example, in the embodiment shown in FIGS. 1 to 4, first and second front wheels 118a and 118b are powered for forward and reverse movement of the vehicle, and rear wheels 118c and 118d are connected together as part of a pivoting rear wheel assembly 120 (best shown in FIGS. 10A to 10D). The rear wheel assembly 120 is motor-driven to pivot about a vertical axis to steer the vehicle 100. The wheels 118c and 118d of the rear wheel assembly may be freely rotating, or they may be powered for forward and/or reverse motion as well, as in case of an all-wheel-drive configuration/embodiment. Various other wheel, steering, and drive configurations may be used in other embodiments.

The vehicle 100 may comprise a motor (not shown) for driving the wheels. For example, the vehicle 100 may comprise an electric motor and at least one power source (not shown), such as a battery. The vehicle 100 may be rechargeable at an electric charging station (not shown). The vehicle 100 may also comprise an automated driving and/or navigation control system for driving and/or navigating the vehicle to a delivery location. Navigation signals for controlling the route navigated by the vehicle 100 may also be received from a remote computing device (e.g., a remote server) as described below. The automated driving and/or navigation control system may be included in an onboard control system of the vehicle 100.

The vehicle 100 may include various sensors, such as camera 117, to aid with navigation and self-driving functions. The camera 117 may be a 360 degree surround view camera for example. The camera may be used by a remote human operator to monitor the area around the vehicle 100 in some embodiments. However, embodiments are not limited to any particular type, number, or arrangement of such sensors.

Figure 3:
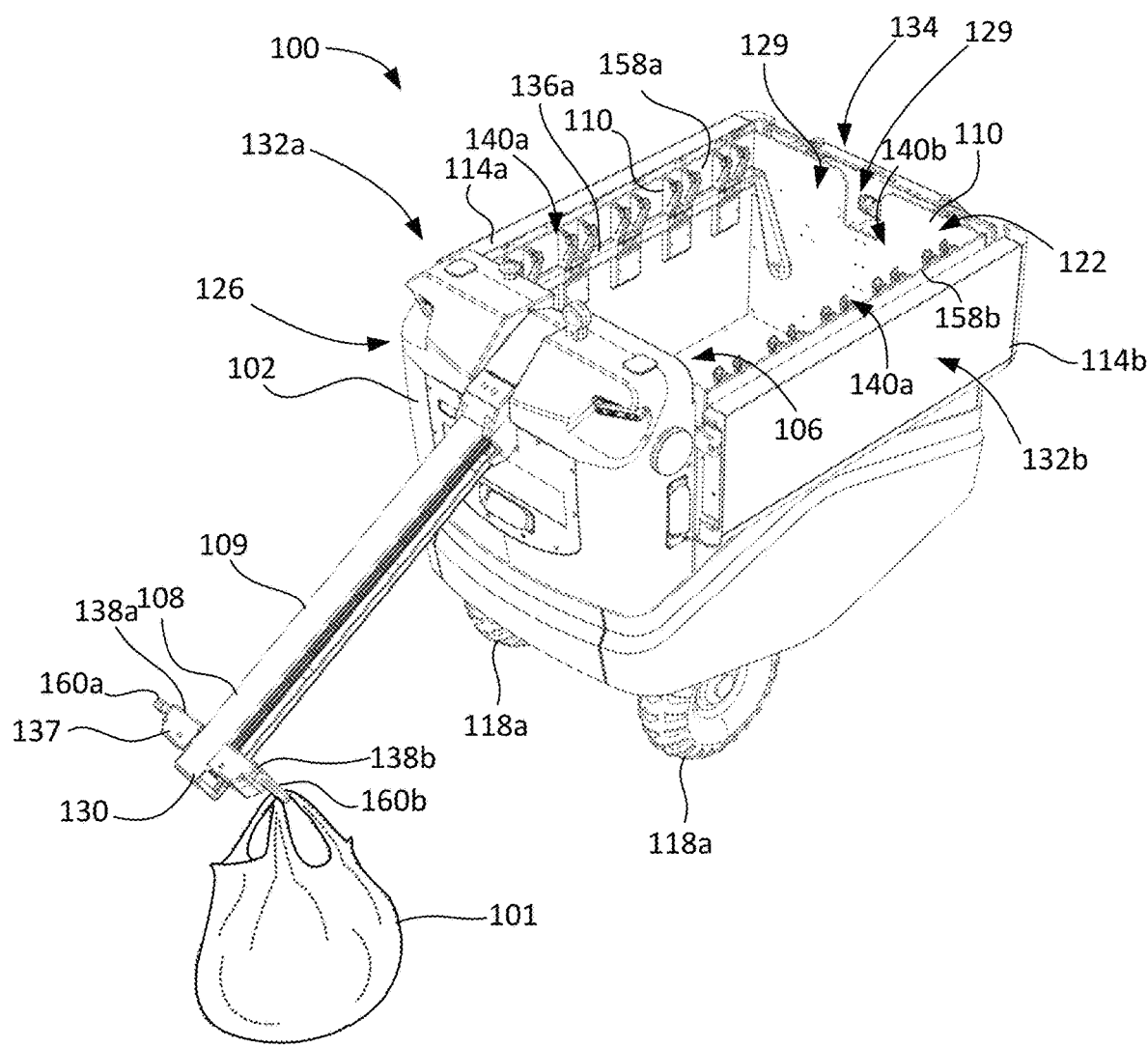
FIG. 3 is a front perspective of the vehicle of FIG. 1, with bay doors opened and the unloading arm in an extended position.
Figure 4:
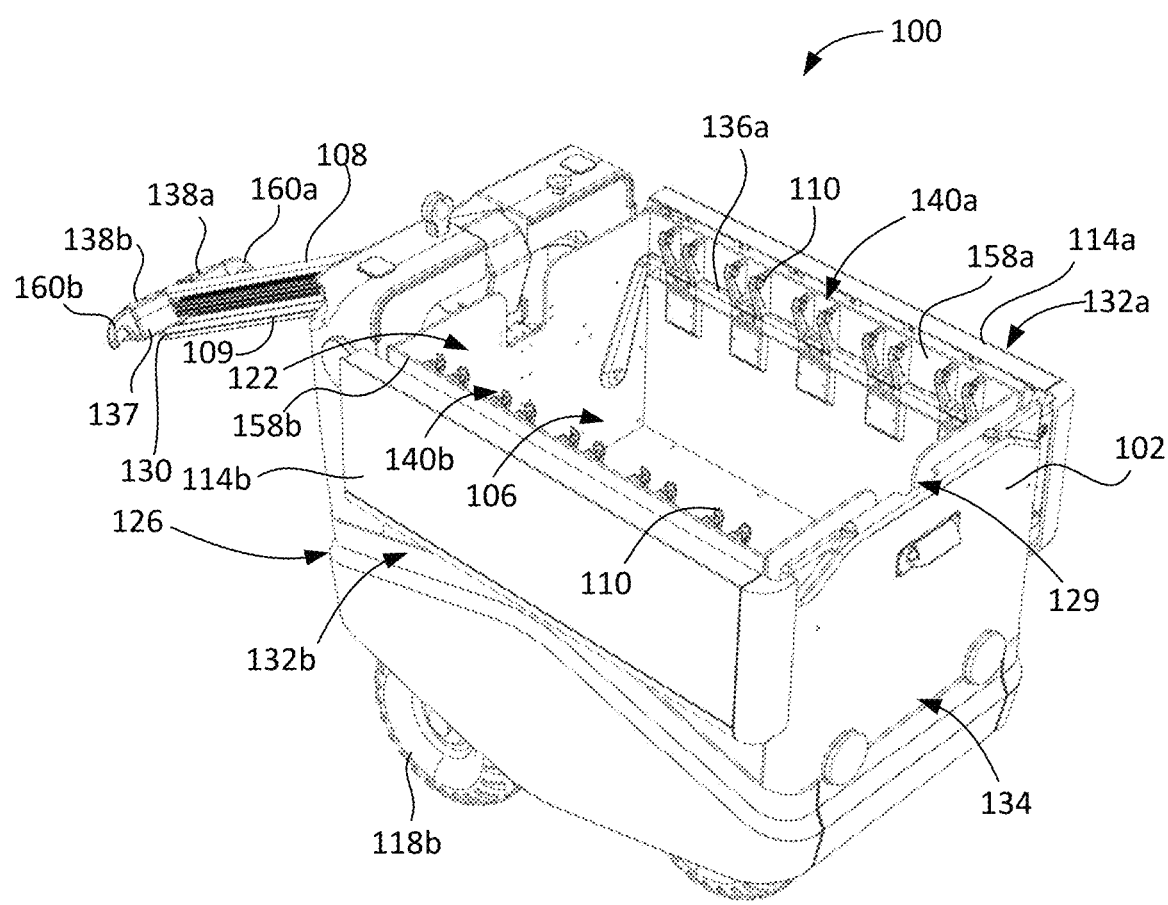
FIG. 4 is a rear perspective view of the vehicle of FIG. 3.

FIGS. 3 and 4 are front and rear perspective views of the vehicle in a delivery configuration. The bay is visible in FIGS. 3 and 4. The bay 106 comprises a hollow inner space defined within the body 102. The bay 106 has a top opening 122 that provides access to the bay 106 and provides clearance for movement of the unloading arm 108. The bay doors 114a and 114b are movable between closed and opened positions. In the closed position shown in FIGS. 1 and 2, the doors 114a and 114b cover the top opening 122 of the bay 106. In the opened position, the doors 114a and 114b do not cover top opening 122. Thus, the bay 106 in this example has a top-loading configuration.

The unloading arm 108 is pivotably mounted near a front end 126 of the vehicle 100 and adjacent the top opening 122 of the bay 106 in this embodiment. The unloading arm pivots or rotates between a retracted position within the bay 106, (shown in FIG. 5), and extended positions in which the unloading arm 108 extends from the bay 106 to the outside environment. An extended arm position for delivering an example bag 101 is shown in FIGS. 3 and 4. The unloading arm 108 in this example rotates in a vertical plane about a horizontal axis at a pivot axis 128 (shown in FIG. 5). In the retracted position, in this example, the unloading arm 108 extends horizontally rearward into the bay 106. The pivot axis 128 (shown in FIG. 5) for the unloading arm 108 is positioned near, but below, the top of the body 102 so that the unloading arm 108 is at an elevation near, but below, the top of the bay 106 in the retracted position. In this example, the unloading arm 108 is sized to extend the entire length of the bay 106. Specifically, the unloading arm 108 is slightly longer than the bay 106, and a recess 129 near a rear 134 of the body receives the distal end 130 of the unloading arm 108 in the retracted position. In this example embodiment, the unloading arm 108 is mounted approximate midway between first and second sides 132a and 132b of the vehicle, such that the pivoting rotation of the unloading arm 108 is along a vertical plane that approximately bisects the vehicle 100. The positioning and movement of the arm may vary in other embodiments. For example, while the vehicle 100 of FIGS. 1 to 4 is in a top loading/unloading configuration, other embodiments may have the unloading arm and bay configured for side loading/unloading.

Figure 5:
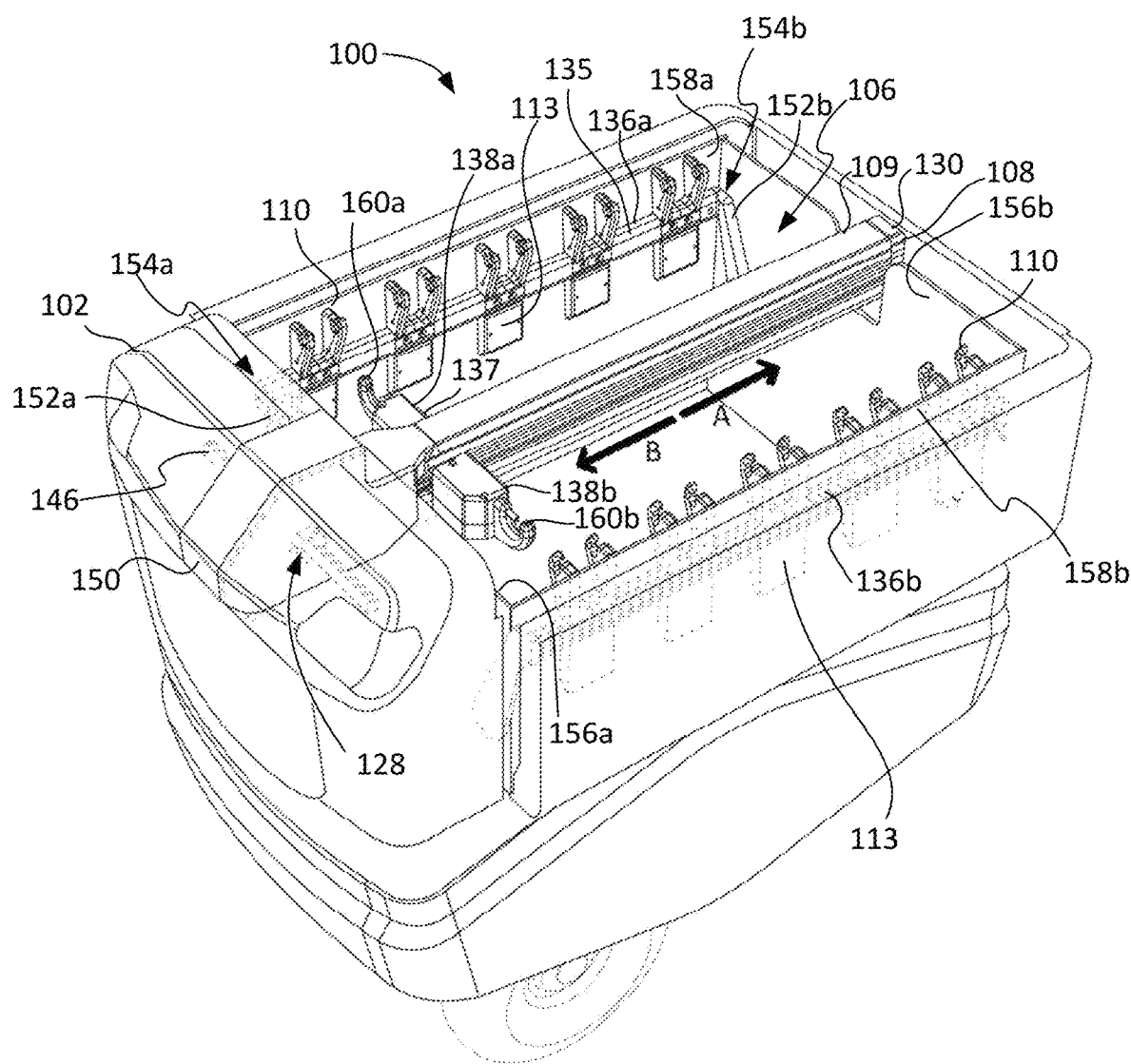
FIG. 5 is an upper perspective view of the vehicle of FIGS. 1 to 4 showing additional detail of an unloading arm and bay.

Starting from the retracted arm position shown in FIG. 5, the unloading arm 108 rotates upward and forward about the pivot axis 128. The distal end 130 of the unloading arm 108 is thereby raised above the bay 106 and moves in an arc about the pivot axis 128. The unloading arm 108 may continue to rotate at least to the forward and extended position shown in FIGS. 3 and 4, for drop off or pick-up of one or more containers (such as bag 101 shown in FIG. 3). In this forward position, the distal end 130 is positioned forward of the vehicle 100 for dropping off a bag. Embodiments are not limited to the unloading arm 108 rotating to a position forward of the body 102. Rather, the unloading arm 108 may rotate to a side or a rear position in other embodiments.

The hangers 110 are spaced apart and arranged in two rows 140a and 140b. The rows 140a and 140b are positioned to be substantially parallel to and aligned with opposite sides of the unloading arm 108, when the unloading arm 108 is in the retracted position. The hangers 110 of each row 140a and 140b are, in this embodiment, equidistant from the corresponding side of the unloading arm. Each hanger 110 faces toward the unloading arm 108. Each hanger 110 is configured to have a container (such as bag 101 shown in FIG. 3) hung therefrom. In other embodiments, one row of one or more hangers may be provided rather than two. Embodiments are not limited to a particular number or position of hangers, and hangers may not be arranged in longitudinally aligned pairs in other embodiments.

In this example, the vehicle further comprises container identification means. The container identification means are in the form of a plurality of RFID readers 113 in this embodiment, though other means of identifying containers may be used in other embodiments.

The unloading arm 108 in this example comprises an elongate arm member 109, and a hook carriage 137 mounted on the arm member 109. The hook carriage 137 travels longitudinally along the arm member 109. The hook carriage 137 includes first and second adjustable carriage sections 138a and 138b positioned on opposite sides of the arm member 109. Each carriage section 138a and 138b includes a respective arm hook 160a or 160b extending therefrom for selectively engaging one or more containers that may be hung on the hangers 110 on the corresponding side of the unloading arm 108. The hook carriage is longitudinally movable along the length of the arm member 109 such that it can be selectively aligned with each of the hangers 110. Specifically, the hook carriage 137 has a plurality of positions along the length of the unloading arm 108, where each position is aligned with and positioned between a respective pair of hangers 110 (one on each side). The carriage sections 138a and 138b may, thus, be selectively positioned for picking up each of the bags from the hangers 110, as will be described in more detail below.

While hooks 160a and 160b are used for engaging containers hung from hangers 110 in this example, other types of container carrying member structures may be used in other embodiments. For example, a rod with a ball or other enlarged structure on one end may also function to engage and lift a container handle from a hanger.

In this example, each row (140a, 140b) of hangers 110 is mounted on a respective hanger frame 136a or hanger frame 136b (shown in FIG. 5). The hanger frames 136a and 136b are individually and selectively laterally movable, relative to the arm 108, between retracted and extended positions. In the retracted position, the hanger frames 136a and 136b are positioned near inner side walls 158a and 158b of the bay 106, and in the extended positions, the hanger frames 136a and 136b are moved laterally away from the walls 158a and 158b and toward the arm 108 to laterally align the hangers 110 with the carriage sections 138a and 138b for unloading bags from the hangers 110. FIGS. 9C and 9D show the hanger frame 136a in the extended position.

As shown in FIGS. 3 and 4, in the opened position, the bay doors 114a and 114b are disposed substantially adjacent the sides 132a and 132b of the body 102 and do not extend above the height of the body 102. This may enable easier loading and unloading from the bay 106 and reduce the risk of one or more bags colliding with the opened bay doors 114a and 114b during this process. The skilled person will appreciate that various types of doors and mechanical couplings may be used to provide that the doors do not extend above the body 102 in the opened position, and embodiments are not limited to a particular structural arrangement. The mechanism and movement for opening the doors 114a and 114b is discussed in more detail below with reference to FIGS. 15A to 15D.

The device may also include one or more antennas (not shown) for communication between the vehicle and one or more servers over a wireless communication network. An example system including a remote server and communication operations will be described in more detail below with reference to FIG. 13.

Additional details of the unloading arm 108, hangers 110 and unloading process will now be described in more detail with reference to FIGS. 5 and 6.

FIG. 5 is an upper front perspective view of the vehicle 100 of FIGS. 1 to 4. With reference to FIG. 5, the unloading arm 108 has a proximal end 150 and a distal end 130. The arm member 109 is pivotably connected to the body 102 and about pivot axle 146 near the proximal end 150. The axle 146 is located slightly forward of the bay 106 and is near, but spaced below the top of the body 102. The unloading arm is motor driven to rotate about a pivot axis 128 defined by the axle 146 and to move the hook carriage 137 longitudinally along the unloading arm 108 in both the distal direction (i.e. the direction toward the distal end 130 of the unloading arm 108, as indicated by arrow "A") and the proximal direction (i.e. the direction toward proximal end 150 of the arm 108, as indicated by arrow "B"). The longitudinal movement of the hook carriage 137 is motorized and controlled by a control system of the vehicle discussed below.

The first hanger frame 136a comprises an elongate, straight frame section 135 horizontally oriented with a front end 154a and a rear end 154b. The first hanger frame 136a has five hangers 110 mounted thereto in an equally spaced arrangement. The number and arrangement of hangers 110 may vary in other embodiments. The hanger frame 136a further includes front and rear pivot members 152a and 152b extending from the front and rear ends 154a and 154b of the horizontal frame section 135 respectively. The front and rear pivot members 152a and 152b extend at a downward angle from the first hanger frame 136a and are pivotably connected to front 156a wall and rear wall 156b of the bay 106 respectively. The front and rear pivot members 152a and 152b rotate in a plane transverse to the arm 108 (with the arm 108 in the retracted position). The front and rear pivot members 152a and 152b rotate to move the first hanger frame 136a laterally between the retracted position (shown in FIG. 5) and the extended position. The hanger 136a is shown in the extended position in FIGS. 9C and 9D.

In the retracted position, the first hanger frame 136a is adjacent the corresponding first inner side 158a of the bay 106. In the retracted position, the hook carriage 137 has clearance from the hangers 110 for longitudinal movement. In the extended position (FIGS. 9C and 9D) the hangers 110 and first hanger frame 136a are moved laterally toward the arm 108 so that the first arm hook 160a of the first carriage section 138a is laterally aligned to engage a bag (or other container) held by one of the hangers 110. The longitudinal adjustment of the carriage section 138a selects which one of the hangers 110 on the first hanger frame 136a will be engaged. Rather than laterally extended and retracted, in other embodiments, hanger frames may move between raised and lowered positions. Any first position (e.g. extended position) that aligns the hanger with the hook carriage and second position (e.g. retraced position) that provides clearance for longitudinal movement of the hook carriage may be used for hangers in other embodiments.

The second hanger frame 136b has a structure that mirrors the first hanger frame 136a, and the second hanger frame 136b is mounted proximate the opposite, second inner side 158b of the bay 106. The second hanger frame 136b is likewise movable between similar retracted and extended positions for selective engagement of the corresponding hangers 110 with the second arm hook 160b of the second carriage section 138b. The movement of the first and second hanger frames 136a and 136b driven by a motor, for example, or any other suitable other means. Various mechanisms and arrangements may be provided to drive movement the hanger frames 136a and 136b between extended and retracted positions.

The longitudinal adjustment of the carriage section 138b along the unloading arm 108 determines which one of the hangers 110 on the first hanger frame 136 will be engaged. The RFID readers 113 are positioned on the inner side walls 158a and 158b, with each RFID reader 113 positioned proximate a respective one of the hangers 110. The RFID readers are configured to read RFID tags. Each bag placed in the bay 106 on a hanger 110 may have an RFID tag with identification information corresponding to the bag. The RFID readers are connected to a processor of the vehicle 100, such that the identification information may be retrieved by the processor. The vehicle may thereby track which bags are hung on which hooks, and the processor may control the unloading arm 108 to unload a selected one or more bags accordingly. The control of the vehicle and unloading process will be explained in more detail with reference to FIGS. 9A to 9H and 12 below.

Figure 6:
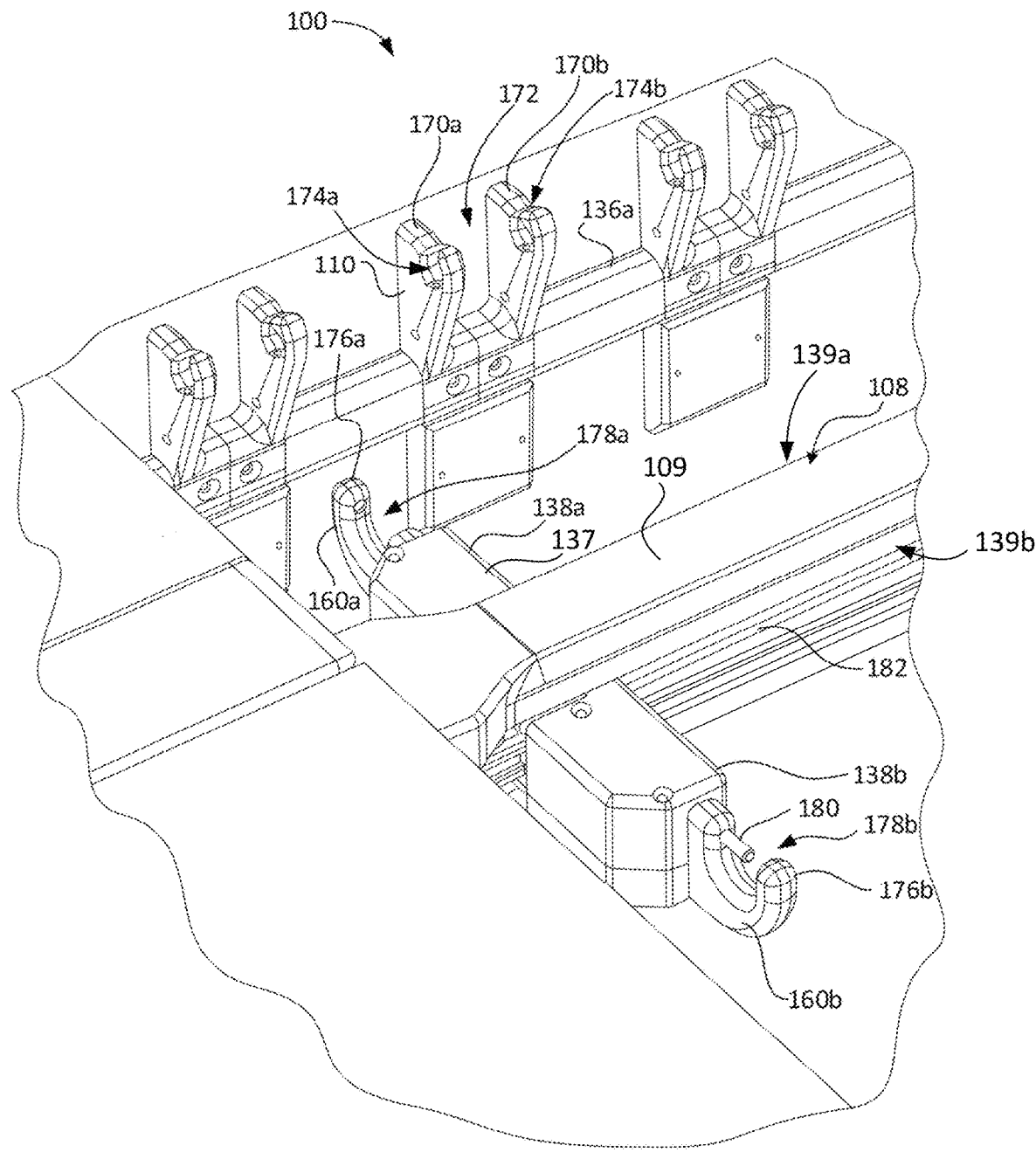
FIG. 6 is an enlarged partial view of the vehicle as configured in FIG. 5.

FIG. 6 is an enlarged partial view of the vehicle 100 as configured in FIG. 5. Each hanger 110 comprises first and second hanger hooks 170a and 170b that are spaced apart and extend upward and toward the unloading arm 108 from the corresponding hanger frame 136a or 136b. Each hanger hook 170a and 170b defines a respective upward facing gap 174a or 174b for receiving a container handle or the like (e.g. bag handle). The hanger hooks 170a and 170b are spaced apart to form a vertical channel 172 therebetween for each hanger 110. At least one container may be hung over both hanger hooks 170a and 170b with at least one handle thereof received in the gaps 174a and 174b.

The first and second carriage sections 138a and 138b of the unloading arm comprise the first and second arm hooks 160a and 160b respectively. The hooks 160a and 160b may each be longitudinally aligned with any one of the hangers 110 on the corresponding side of the unloading arm 108 to pick up a bag from the hanger. Specifically, each arm hook 160a and 160b is arcuate with an end tip 176a or 176b that is upward facing when the arm 108 is in the retracted position.

When the first hanger frame 136a is in the laterally extended position (shown in FIGS. 9C and 9D) and the arm hook 160a is longitudinally aligned with a given hanger 110 on the first hanger frame 136a, the tip 176 of the first arm hook 160a is positioned below the hooks 170a and 170b the hanger 110. Thus, if a bag handle has been hung across the hooks 170a and 170b in gaps 174a and 174b, the arm 108 may be raised and the tip 176a of the first arm hook 160a will pass upward through the channel 172 and the bag handle will become landed in the gap 178a of the arm hook 160a. The bag may thereby be engaged and lifted from the hanger 110 by the arm hook 160*a*. A bag may also be deposited on the hanger 110 by lowering the arm 108 in the reverse motion to the retraced position. The second arm hook 160*b* may likewise be used to pick up bags from the hangers 110 of the second hanger frame 136*b* (shown in FIG. 5).

In some embodiments, each carriage section 138*a* and 138*b* further comprises a container retaining mechanism to help secure the container in the arm hook 160*a* or 160*b*. In this example embodiment, the container retaining mechanism is an extendable and retractable pin 180 for selectively closing the respective arm hook gap (178*a*, 178*b*). The pin 180 retracts into the carriage section (138*a*, 138*b*) to allow a bag handle, or other container handle, to be moved into or out of the corresponding arm hook gap (178*a*, 178*b*). The pin 180 extends across the corresponding arm hook gap (178*a* or 178*b*) to secure the bag handle within the corresponding arm hook (160*a*, 160*b*) when the arm 108 rotates to the extended position, and the hooks 160*a* and 160*b* are turned upside-down. The bags held by the hooks 160*a* and 160*b* and pins 180 may thus be kept from falling out of the hooks 160*a* and 160*b* during movement of the unloading arm 108. The pins 180 may be retracted to release the bag either when hanging the bag on a hanger 110, or delivering the bag when the unloading arm 108 is fully extended.

To actuate the extension and retraction of the pins 180, any type of suitable pin actuator may be used. For example, the pin actuator may comprise one or more of an electrical actuator, an electromagnet, a servo mechanism that can move the pin in and out, or a mechanical implementation where the pins 180 are pushed out by indents along the arm member 109 or just at the end of the travel of the carriage 137 along the arm.

In other embodiments, the vehicle may comprise a different container retainer mechanism rather than one or more pins. For example, container retainer mechanism may comprise any structure suitable to releasably secure a container to a hook or other container carrying member. The container retainer mechanism may comprise a clamp, a latch, or any other suitable structure in other embodiments. The container retainer mechanism may be omitted in other embodiments. For example, the structure of the container carrying member in some embodiments may be sufficient to securely carry the container through the movement of the arm The hook carriage 137 is slidably engaged to at least one guide track 182 that runs lengthwise along the unloading arm 108. The at least one guide track 182 in this example extends from the distal end 130 along the majority of the length of the unloading arm 108. In this example, the at least one guide track 182 comprises a track that extends longitudinally through the arm 108 and faces outward from both sides 139*a* and 139*b* of the arm 108. Any suitable means for mechanically actuating the first and second hooks 160*a* and 160*b* for movement along the at least one guide track 182 may be used, and embodiments are not limited to this specific example. For example, the movement may be belt-driven.

Figure 7:
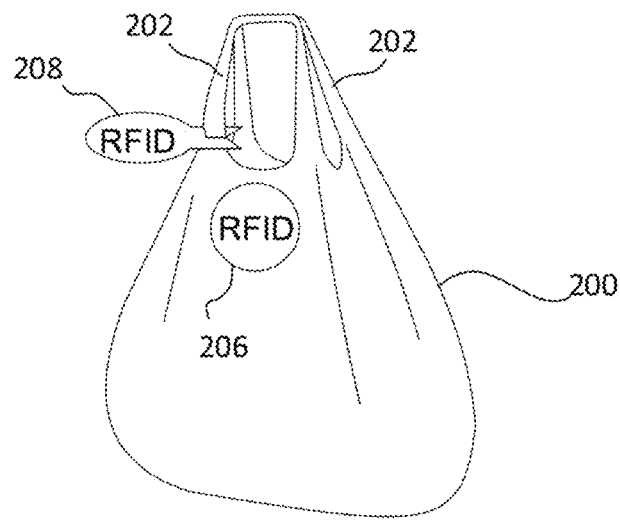
FIG. 7 is a rear view of an example bag that may be transported for delivery, and unloaded at a delivery location by the vehicle of FIGS. 1 to 6.

FIG. 7 is a rear view of an example bag 200 that may be loaded with product(s), transported for delivery, and unloaded at a delivery location by the vehicle 100 in FIGS. 1 to 6. The bag 200 includes two handles 202. However, other bag types or other containers may include a single handle or similar hanging means. An example RFID tag 206 is shown on the bag 200. The RFID tag 206 is in the form of an adhesive decal with an RFID chip within. Alternatively, rather than a decal adhered to the bag 200, a clip 208 may be used to clip an RFID tag to the bag 200, as shown. Embodiments are not limited to particular methods of providing an RFID tag. Positioning and type of RFID tag may vary, and RFID tags and readers may be omitted in other embodiments.

Figure 8:
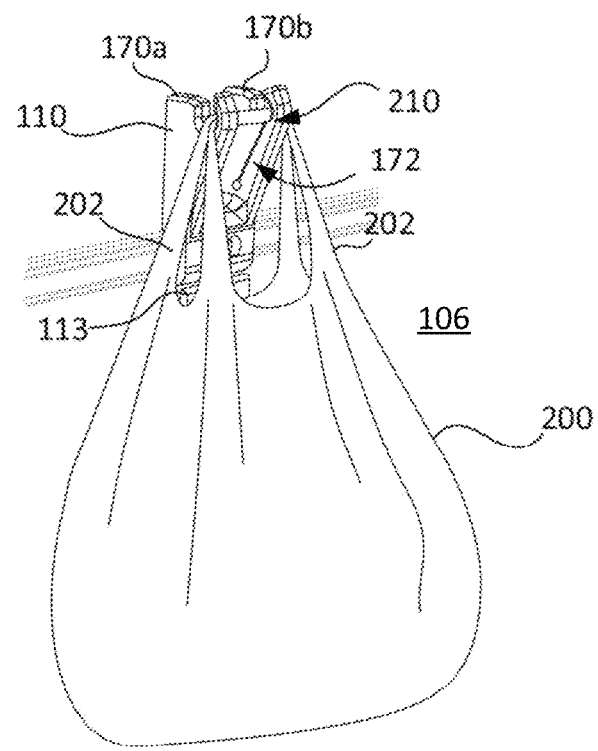
FIG. 8 is a front perspective view of the bag hung within the bay of the vehicle of FIGS. 1 to 6.

FIG. 8 is a front perspective view of the bag 200 hung within the bay 106 on one of the hangers 110 of the vehicle 100 of FIGS. 1 to 6. The RFID reader 113 positioned under the hanger 110 may read identification information from the RFID tag 206 (or RFID clip 208) shown in FIG. 7, which is positioned adjacent the RFID reader 113. As also shown, an upper portion 210 of the handles 202 is held between the first and second hanger hooks 170*a* and 170*b* of the hanger 110 such that the corresponding arm hook of the unloading arm may pass through the channel 172 and engage the handles 202 of the bag 200 for unloading.

FIGS. 9A to 9H are perspective views of the unloading arm 108, hangers 110, hanger frames 136*a* and 136*b*, RFID readers 113, and bay 106 illustrating the sequence of movement that the unloading arm 108 and hangers 110 may follow to unload a bag or other container from one of the hangers 110. FIGS. 9A to 9H show the second side wall 158*b*, the rear wall 156*b*, and the floor 161 of the bay 106. The first side wall 158*a* and front wall 156*a* wall visible in FIG. 5 are omitted.

In this example, the vehicle 100 receives instructions (e.g. from a remote server) to deliver a particular bag (not shown) hanging on hanger 110*a*. The bag ID may be known by the vehicle to be hanging on the hanger 110*a* if the bag was scanned by a worker (using the corresponding RFID reader 113*a*) when the bag was hung in the bay 106. At the delivery address, the vehicle 100 controls the unloading arm 108 and first hanger frame 136*a* to and move through the configurations shown in the FIGS. 9B to 9H to unload the bag.

Figure 9A:
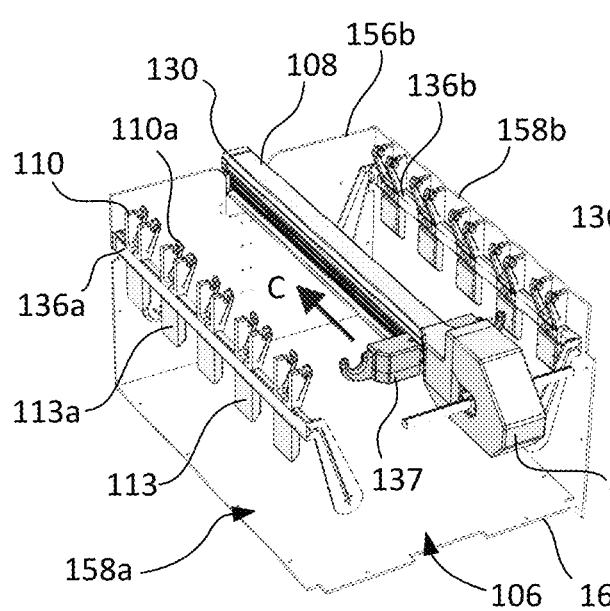
Figure 9B:
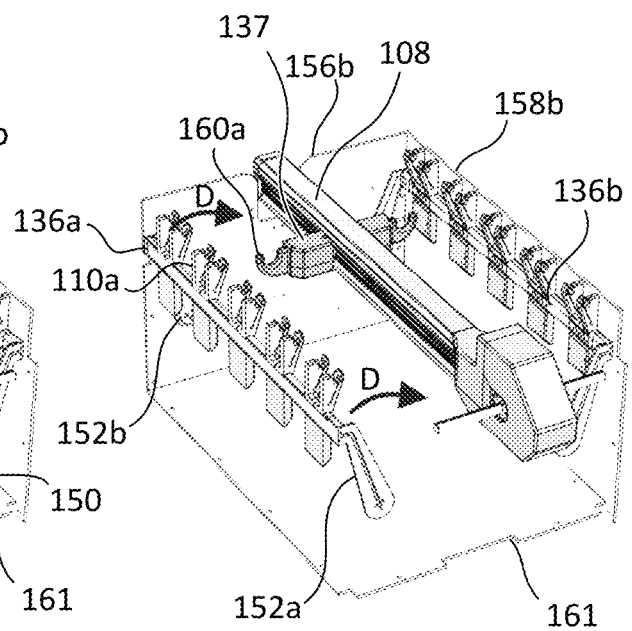
Figure 9C:
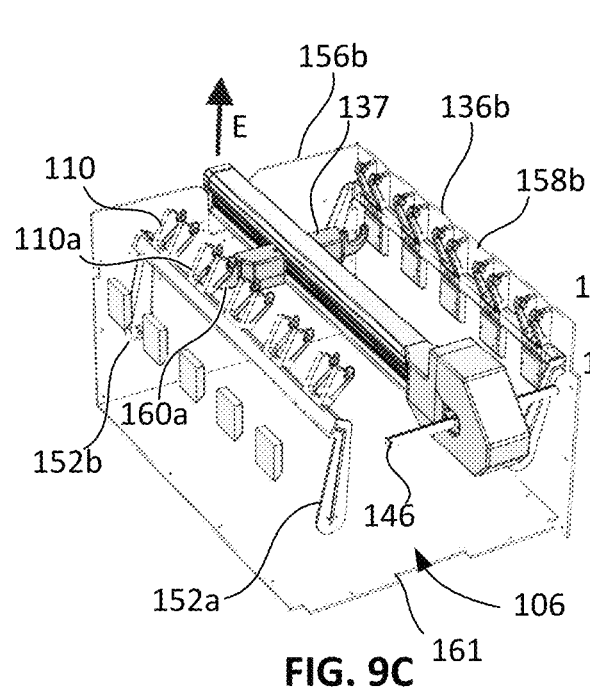
Figure 9D:
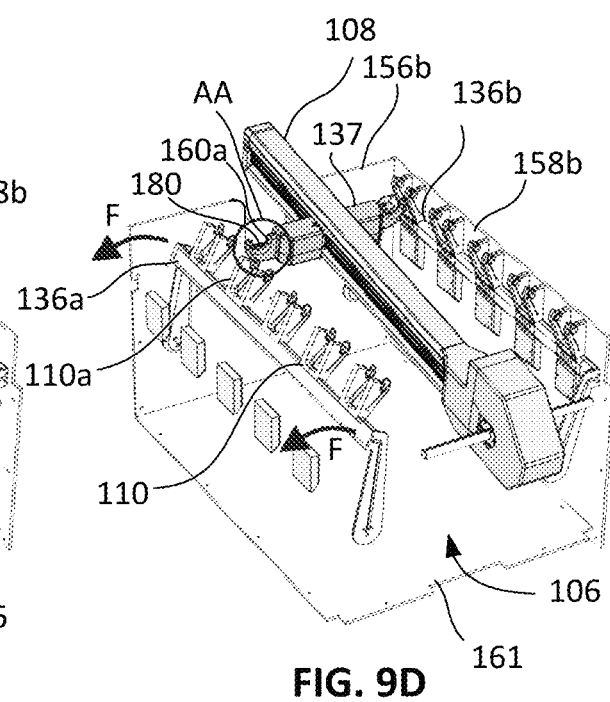
Figure 9H:
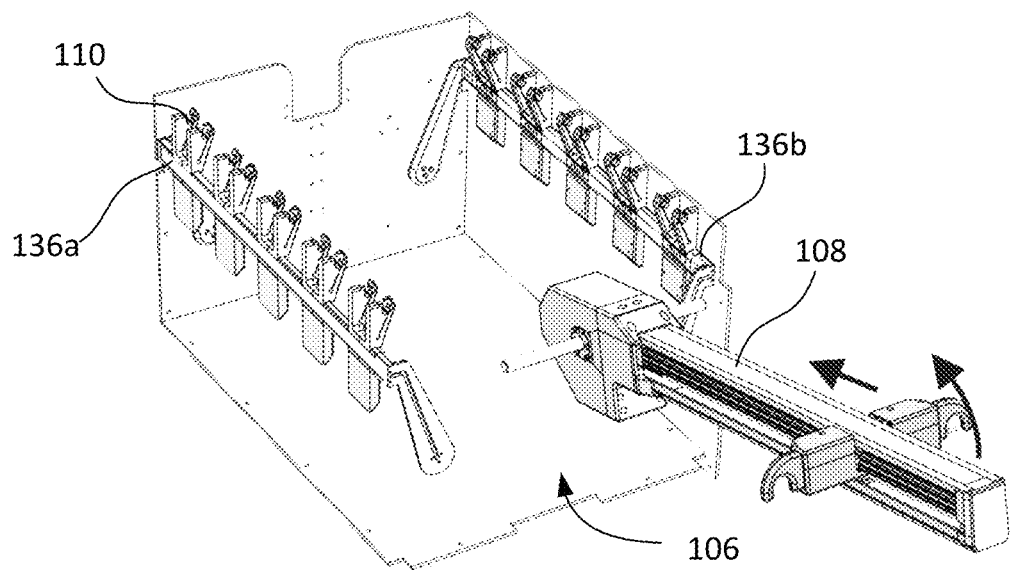

Starting with FIG. 9A, the unloading arm 108 is in the retracted position. The first and second hanger frames 136*a* and 136*b* are both in the retracted position (i.e. with the hangers 110 adjacent corresponding side walls 158*a* and 158*b* of the bay 106. In this position, the bay doors 114*a* and 114*b* (not shown in FIGS. 9A to 9H) may be closed over the unloading arm 108. The bay doors 114*a* and 114*b* may, therefore, be moved to the opened position prior to any rotational movement of the unloading arm 108. In FIG. 9A, the hook carriage 137 is in a proximate-most position (i.e. near the proximal end 150). The hook carriage 137 moves longitudinally toward the distal end 130 (in the direction indicated by arrow "C") until the first arm hook 160*a* is longitudinally aligned with the hanger 110*a*, as shown in FIG. 9B With reference to FIG. 9B, the first hanger frame 136*a* may move laterally from the retracted position to the extended position (shown in FIG. 9C) by rotating movement of the pivot members 152*a* and 152*b*. This movement direction is illustrated by arrows "D" in FIG. 9B.

In FIG. 9C, the first arm hook 160*a* is now longitudinally and laterally aligned with the hanger 110*a* for picking up the bag (not shown) from the hanger 110*a*. Thus, the unloading arm 108 is rotated about the pivot axle 146 such that the unloading arm 108 is initially raised (as indicated by arrow "E" away from the bay 106. The first arm hook 160*a* engages and lifts the bag as the unloading arm 108 is raised.

As illustrated in FIG. 9D, when the first arm hook 160*a* has been lifted to a predetermined height above the hanger 110*a* (such that the bag is held by the first arm hook 160*a*), the pin 180 is extended, thereby closing the hook 160*a*, to secure the bag. The first hanger frame 136*a* may move back to the retracted position, as illustrated by arrows "F". FIG.

Figure 9I:
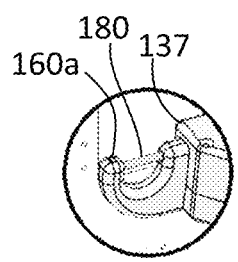
FIG. 9I is an enlarged view of the portion of a hook carriage within circle 'AA' in FIG. 9D.

9I is an enlarged view of the portion of the hook carriage 137 and hook 160a within circle 'AA' in FIG. 9D. FIG. 9I shows the pin 180 extended.

As the unloading arm 108 rotates toward the extended position, the hook carriage 137 may move to the distal end 130 of the arm, as illustrated by arrow "G" in FIG. 9E.

The unloading arm 108 continues to rotate through the position shown in FIG. 9F to the fully extended position shown in FIG. 9G. This position is also shown with the entire vehicle 100 in FIGS. 3 and 4. At this point the pin 180 (visible in FIG. 9D) is retracted back in to the first carriage section 138a to release the bag from the first arm hook 160a. The unloading arm 108 may then begin moving back to the initial retracted configuration of FIG. 9A.

Embodiments are not limited to the inclusion of a hook carriage for moving hooks along the unloading arm. In other embodiments, one or more hooks (or other container carrying members) may be directly coupled to a longitudinal adjustment mechanism for longitudinal movement along the arm member 109. Embodiments including a hook carriage are also not limited to a single carriage moving the one or more hooks (or other container carrying members). For example, rather than one hook carriage, two separate hook carriages or modules with respective hooks may be independently coupled to the arm 108 and individually adjustable in the longitudinal direction in other embodiments. Each separate hook carriage or module may be driven by a separate actuator and/or mechanical power source.

Figure 10A:
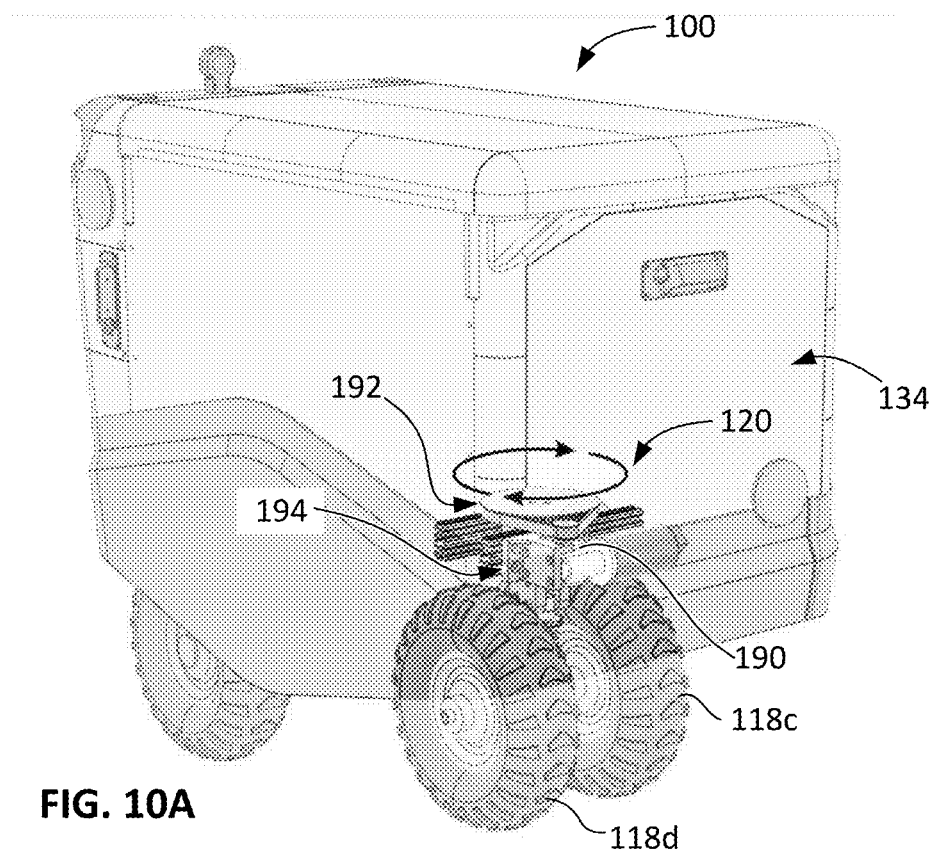
FIG. 10A is a rear perspective view of the vehicle of FIGS. 1 to 6 showing a rear wheel assembly according to some embodiments.
Figure 10B:
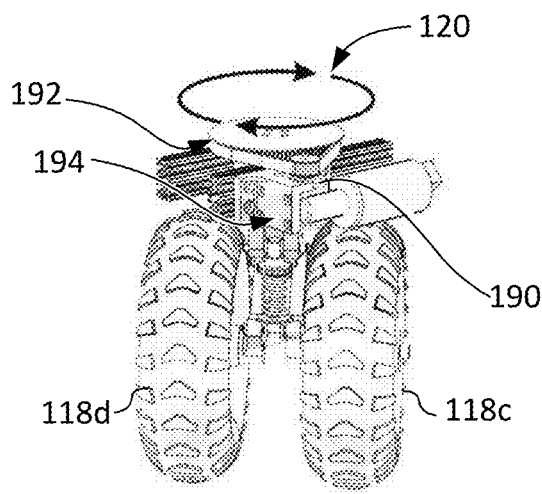
FIGS. 10B and 10C are enlarged views of rear wheel assembly of FIG. 10A, showing the rear wheel assembly in different angular positions.
Figure 10C:
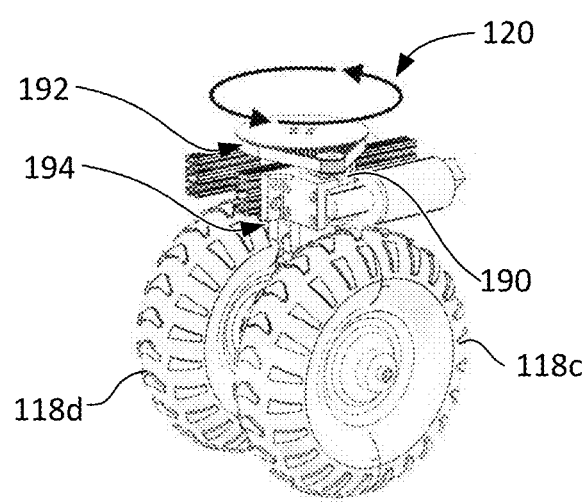
Figure 10D:
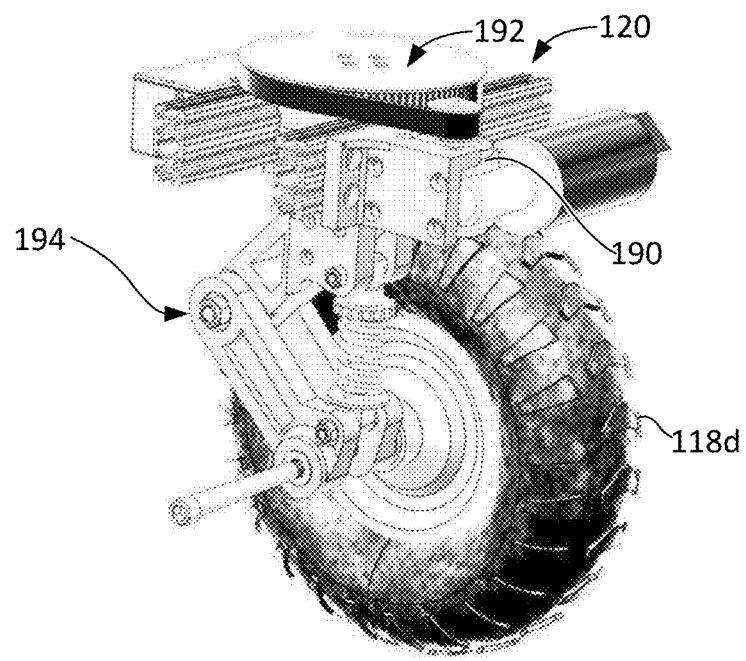
FIG. 10D is a perspective view of the rear wheel assembly of FIGS. 10A to 10C in isolation, with one wheel removed.

FIG. 10A is a rear perspective view of the vehicle of FIGS. 1 to 6 in which the rear wheel assembly 120 is shown visible through the body 102 for illustrative purposes. FIGS. 10B and 10C are enlarged perspective views of t rear wheel assembly 120, in isolation, and in different angular positions. FIG. 10D is a perspective view of the rear wheel assembly 120 in isolation, with wheel 118c removed.

The rear wheel assembly 120 shown in FIGS. 10A to 10D is positioned near the rear 134 of the vehicle and is the means for steering the vehicle 100. By pivoting the rear wheel assembly 120 about a vertical axis, the vehicle 100 may be steered for navigating its route. Steering may be accomplished by a differential drive system using the front wheels 118a and 118b. That is, the front wheels 118a and 118b may be individually and selectively controlled to revolve at different speeds to steer the vehicle 100.

In this example, the rear wheel assembly 120 comprises wheels 118c and 118d, an electric motor 190 that is coupled to an axel assembly 194 by pulley system 192. The wheels 118c and 118d are mounted to the axel assembly 194. Thus, the electric motor 190 may drives rotation of the axel assembly 194 (and thereby the wheels 118c and 118d) by means of the pulley system 192. The rear wheel assembly 120 may provide stability for the differential steering system. In some embodiments, the rear wheel assembly may comprise passive caster wheels. However, such passive wheels are dragged behind the actual motion and as a result may create some unwanted resistance and secondary swing motions. Thus, in this embodiment, the rear wheel assembly is active in that it is controlled by a processor via a motor 190 (which may be a servo-motor). The motor 190 may set the proper angle pro-actively, turning the rear wheel assembly just before the steering via the front wheels 118a and 118b begins. The rear wheel assembly aligned about the vertical axis for the steering may reduce or eliminate such secondary swing motions.

Other locomotion and steering systems, including various wheel arrangements or the like, may be implemented. The vehicle 100 is not limited to the particular steering system shown in FIGS. 10A to 10D. For example, rather than the rear wheel assembly 120, the vehicle in another embodiment may include two rear powered wheels positioned at respective sides of the vehicle. The vehicle would, thus, have four wheels similar to a car arrangement. A first (e.g. left) side pair of front and rear wheels may move together forward or reverse. A second (e.g. right) side pair of front and rear wheels may also move together forward or reverse. The first and second pairs of wheels may thus move the vehicle forward or reverse by driving all four wheels in the same directly. Steering may be accomplished by differential movement of the two pairs, similar to steering a tank via treads. Additional variations on locomotion and steering may be implemented.

Figure 11:
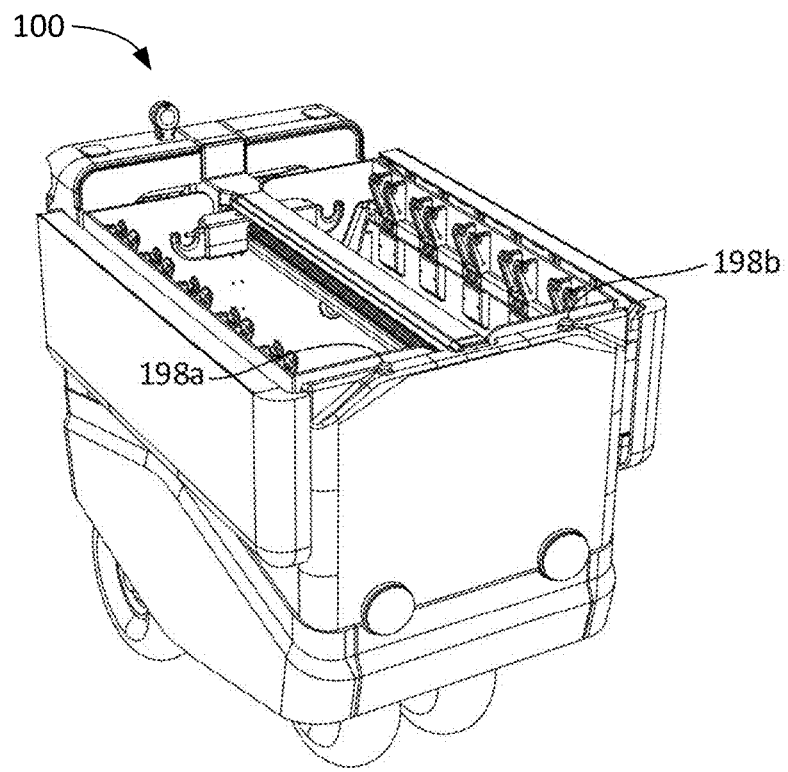
FIG. 11 is a rear perspective view of the vehicle 100 with optional rear-mounted joystick controls.

FIG. 11 is a rear perspective view of the vehicle 100 with optional rear-mounted joysticks 198a and 198b to control steering of the vehicle. The vehicle 100 may include additional user interface devices, such as buttons, sensors that accept user input, etc. For example, a worker in a warehouse may manually steer the vehicle 100 as needed. Other situations where manual steering is desired may arise. The joysticks 198a and 198b may sense the push or pull pressure for each hand and may output signals to a processor accordingly. The input received by the joysticks 198a and 198b may be used to simulate movement similar to pushing/pulling a shopping cart. The processor may send the right command to the front powered wheels 118a and 118b and rear wheel assembly 120 (aligning it to the right angle matching the steering by the front wheels 118a and 118b). Other steering control schemes, control interface elements, and control interface locations on the vehicle may also be used.

Figure 12:
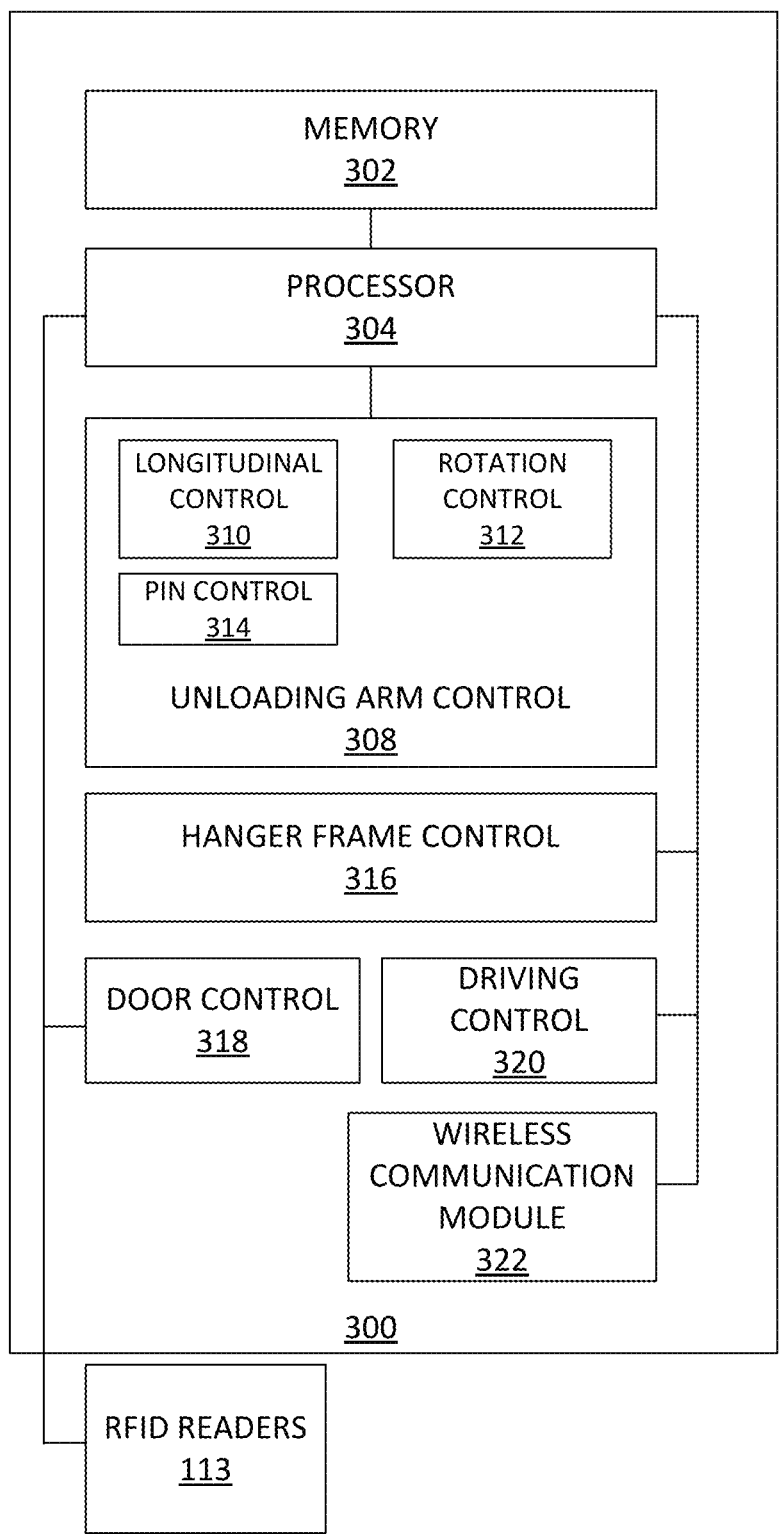
FIG. 12 is a block diagram of an example control system for the vehicle of FIGS. 1 to 6.

FIG. 12 is a block diagram of an example control system 300 for the vehicle 100 of FIGS. 1 to 6 according to some embodiments. The system 300 is an example, and control system configurations may vary in other embodiments. The control system 300 may be onboard the vehicle 100. The example control system includes: a memory 302, a processor 304 coupled to the memory 302, and an unloading arm control module 308, a hanger frame control module 316, a door control module 318, a driving control module 320, and a wireless communication module 322. The RFID readers 113 are external (but coupled to) to the control system 300 in this embodiment. In other embodiments, the RFID readers 113 may be internal to (part of) the control system 300.

The memory 302 may have processor-executable instructions stored thereon that, when executed by the processor, will provide various control functions described herein. One or more of the unloading arm control module 308, the hanger frame control module 316, the door control module 318, the driving control module 320, and the wireless communication module 322 may be internal to and implemented by the processor 304 and memory 302. One or more of these modules may instead be external to the processor 304. Any suitable combination of hardware and/or software may be used to implement the components of the control system.

The unloading arm control module 308 may include a rotation control 312 that controls rotation of the unloading arm 108. For example, the rotation control 312 may be operatively coupled to an electric motor that power rotation of the unloading arm 108. The unloading arm control module 308 further comprises a longitudinal control 310, which controls longitudinal movement of the hook carriage 137 (shown in FIG. 5). For example, the longitudinal control 310 may be operatively coupled to another electric motor that drives distal and proximal moment of the hook carriage 137. The unloading arm control module 308 further comprises a pin control 314, which controls extension and retraction of the pins 180 of the arm carriage sections 138a and 138b. For example, the pin control 314 may be operatively coupled to actuators that selectively drive the extension and retraction.

The hanger frame control module 316 may individually and selectively controls the movement of the first and second hanger frames 136a and 136b (shown in FIG. 5) respectively between the retracted and extended positions. For example, hanger frame control module 316 may be coupled to electric motors or other actuators (not shown) that drive rotation of the pivot members 152a and 152b (shown in FIG. 5). In other embodiments, the hangers are fixed and stationary, and the hanger frame control module 316 may be omitted.

The door control module 318 may control opening and closing of the bay doors 114a and 114b (FIGS. 1 to 5). For example, the door control module 318 may be coupled to electric motors or other actuators that drive opening and closing of the bay doors 114a and 114b, such as the arrangement shown in FIGS. 15A to 15D.

The driving control module 320 may control one or more motors that drive forward and/or reverse motion of the vehicle (e.g. by driving front wheels 118a and 118b shown in FIG. 1). The driving control module 320 may also control the rotation of the axel assembly 194 of the rear wheel assembly 120 (FIGS. 10A to 10D) to assist with steering of the vehicle 100. For example, the driving control module 320 may be coupled to the electric motor 190 shown in FIGS. 10A to 10D. The processor 304 may also control driving of the vehicle 100 (via the driving control module 320) based on user input received from the wireless communication module 322 and/or a user interface of the vehicle. The user interface may, for example, include the joysticks 198a and 198b shown in FIG. 11 and/or other user input means such as touch or proximity sensors.

The wireless communication module 322 may be configured for wireless communication with a remote server or other network element over a wireless network. The wireless communication module 322 may be configured to send and receive wireless communication signals using an antenna. For the communication the vehicle may include two or more antennas placed in separate spots inside the body 102. For example, the wireless communication module 322 may comprise a receiver and transmitter for wireless communication. The wireless communication module 322 may include a Global Positioning System (GPS) module for obtaining location information. The GPS module may assist with navigation of the vehicle 100. The GPS module may also be separate from the wireless communication module 322 and operatively connected to the processor 304. The processor 304 may receive commands for controlling the vehicle 100 via the wireless communication module 322. The wireless communication module 322 may enable sending and/or receiving location information, control signalling, video stream data (e.g. from a camera mounted on the vehicle 100), etc.

The processor 304 may control the vehicle 100 by means of controlling the unloading arm control 308, the hanger frame control module 316, the door control module 318, the driving control module 320, and the wireless communication module 322. The processor 304 may control the modules to perform the unloading process illustrated in FIGS. 9A to 9H.

The processor 304 may receive input via the wireless communication module and/or one or more user input devices on the vehicle, such as buttons (not shown), touchscreens (not shown), the user steering controls 198 shown in FIG. 11, or other user interface elements.

The processor 304 may also be coupled to the RFID readers 113 to operate and receive container ID information from the RFID readers 113.

The vehicle 100 may also include additional circuitry or other hardware not specifically shown that implements the various modules described herein. For example, the vehicle 100 may also include other sensors including, but not limited to: depth cameras, vision based simultaneous localization and mapping (VSLAM) camera, 360-degree camera, gyroscopes, accelerometers, wheel odometry, etc. As one example, the vehicle 100 may include sensors that detect and a path to follow (such as path markers, electronic beacons, etc.).

Figure 13:
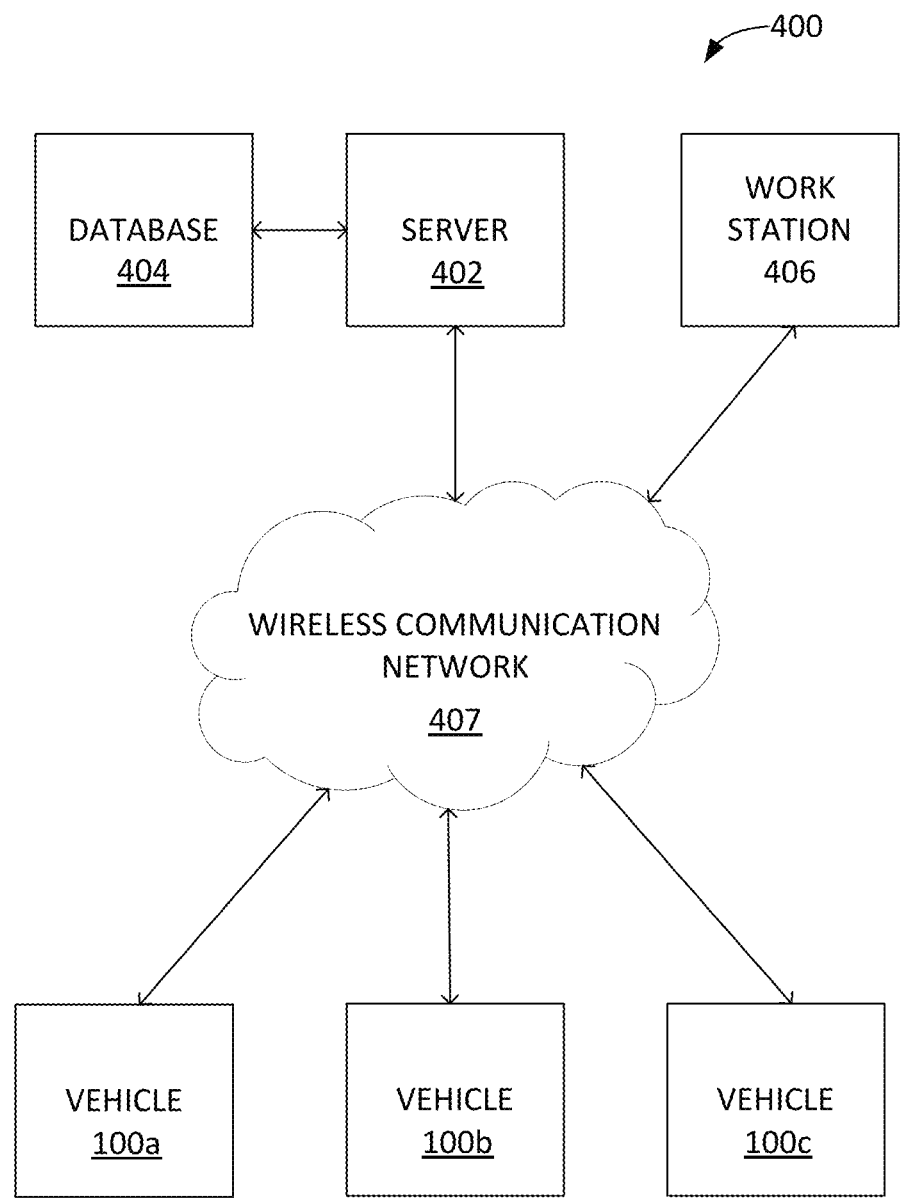
FIG. 13 is a block diagram of an example delivery system according to some embodiments.

FIG. 13 is a block diagram of an example delivery system 400 including a plurality of automated vehicles 100a to 100c, a remote server 402, a database 404 and a workstation 406 for an operator. Each of the vehicles 100a to 100c may, for example, be similar in structure and function to the vehicle 100 described above. Optionally, the system 400 also includes at least one workstation 406, which may be any client computer for use by an operator of the vehicles 100a to 100c.

The database 404 may maintain data regarding goods and/or containers (e.g. bags) in a warehouse and/or other delivery hub, and in the vehicles 100a to 100c. For example, the database 404 may store RFID information corresponding to one or more containers and the current location (e.g. shelf location or vehicle location) of the containers. The database 404 may also store information about current locations of the vehicles 100a to 100c, delivery addresses, customer orders, and/or other information related to delivery of goods.

The server 402 may be in communication with the database 404. In some embodiments, the database 404 may be internal to the server 402. The vehicles 100a to 100c may be in communication with the server 402 over a wireless network 407. The server 402 may generate control signals for the vehicles 100a to 100c based, at least in part, on information in the database 404 and/or information received from the vehicles 100a to 100c.

For example, the server 402 may send control signals to the vehicle 100a to move to a position in a warehouse to wait for one or more bags or other containers from warehouse shelves to be loaded into the vehicle 100a. A human worker may, for example, fill bags with products ordered by a customer. The RFID tag for a bag may be associated with a given order when fulfilled by the worker filling the bag. For example, the worker may attach the RFID tag(s) to the bag(s) at the time the bag(s) are filled. The worker may use a portable electronic communications device (e.g. smartphone) to view order information and to scan the RFID tag(s) for the first time to associate the tag(s) with the order. The communications device may also communicate with the server 402 and database 404 (via the server 402). From this point on, the unique RFID tag may be associated with the specific order in the database 404. A human worker may move the bags from the shelves to the vehicle 100a (i.e. by hanging the bags on hangers in the vehicle bay). The worker may move the bags close enough (e.g. 0 to 10 cm) to the corresponding RFID reader 113 when hanging the bags on a hanger 110 in the vehicle. The worker may ensure that the bag is hung with the RFID tag in the right orientation near the RFID reader 113. One or more LEDS or other visual indicator may indicate when the RFID tag has been read.

When the RFID tag has been successfully read, the position of the bag on the hanger 110 may be less important.

The server 402 may also send the vehicle the RFID information for the one or more bags to the vehicle 100a so that the vehicle 100a can verify that the correct bags are loaded. The server 402 may also send delivery location information corresponding to the one or more bags. In other embodiments, the unloading arm of the vehicle may be configured to load bags as well as unload.

The vehicle 100a may navigate to those one or more delivery locations using any suitable navigation system. For example, the vehicle 100a may be configured with artificial intelligence (AI) self-driving functionality, GPS navigation functionality, and/or any other suitable automated navigation method or combination of methods. At each delivery location, the vehicle 100a may unload the corresponding one or more bags. The vehicle 100a may use RFID information to select the bag(s) for unloading. The server 402 may calculate a navigation route based on a current vehicle location, a delivery location, and map data. The current vehicle location may be received from the vehicle 100a (e.g. using GPS data). The map data may be stored in the database 404 or retrieved from another remote system (e.g. over the internet). The server may also send the current vehicle location and delivery location to a map service over the internet to obtain a route. Route optimization software may be used to optimize the navigation route for the vehicle 100a.

The vehicle 100a may maintain communication with the server 402 throughout the delivery process. The server 402 may coordinate pickups and deliveries of the plurality of vehicles 100a to 100c. Embodiments are not limited to any particular number of vehicles. Similarly, the functionality of the server 402 may be spread across multiple servers or other network elements rather than a single server. Some functions of the server 402 described above may instead be implemented locally on the vehicle rather than a remote server.

An operator may use the workstation for communication with the server 402 and/or control of the vehicles 100a to 100c.

Figure 14:
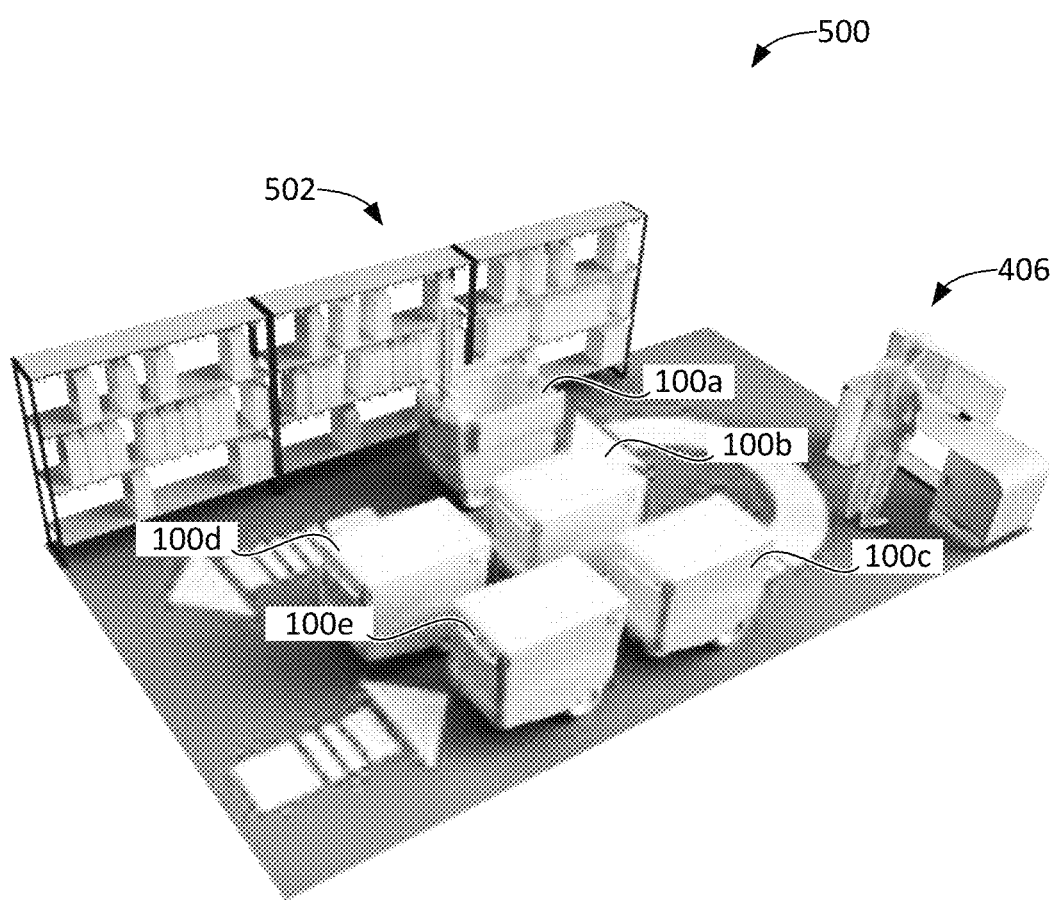
FIG. 14 is a perspective view of an example warehouse environment.

FIG. 14 is a perspective view of an example warehouse environment 500 including an optional plurality of "smart" shelves 502, vehicles 100a to 100e, and an optional workstation 406.

The smart shelves 502 in this example are "smart" in that they may communicate with one or more remote computing devices (e.g. server 402 and database 404 in FIG. 12) and may have RFID readers or other technology to electronically associate a plurality of locations in the shelfs for locations of containers (e.g. bags) and/or identify bags on the shelves. For example, each location identified electronically in the shelves 502 may be for storing one bag. By using RFID tags in the bags and RFID readers in the shelves 502, the location and content of bags stored in the shelves 502 may be monitored and/or stored in a database (such as database 404 in FIG. 12). The shelves 502 may include lights or other visual indicators to assist human workers identify bags to be loaded. For example, the next set of bags to be loaded into the next vehicle (100a, 100b, 100c, 100d, or 100e) may be marked/signaled using some lights in the smart shelves 502. In other embodiments, smart shelves 502 are omitted and human workers may use conventional shelves of any suitable type. The shelves 502 may be used for temporary storage (e.g. in case orders were made with delivery to a later time window) and optimizations (e.g. in case of higher volume where they need to be grouped by destination area). However, the shelves 502 or other temporary storage areas are optional and may be omitted, and vehicles 100a to 100e may be loaded directly after order fulfillment.

A human or machine (not shown) may pack bags and load the bags into the shelves 502. A human or other machine (not shown) may also move selected bags into vehicles 100a to 100e for delivery. The RFID readers inside the vehicles 100a to 100e and/or smart shelves 502 may include LED's that turn green when an RFID tag of a bag has been successfully read.

A remote server (e.g. server 402 in FIG. 12) or workstation 406 may send delivery location and corresponding bag identification information to the vehicles 100a to 100e.

The example workstation 406 may include one or more computers including a user interface for interacting with and/or controlling the vehicles 100a to 100e. An operator at the workstation 406 may monitor the location, content and/or actions of the vehicles 100a to 100e. The workstation 406 may be in direct communication with the vehicles 100a to 100e and/or a server (such as the server 402 in FIG. 12). An operator may use the workstation 406 to issue one or more controls to the vehicles 100a to 100e. The workstation 406 may also interact with the server to control the vehicles 100a to 100e. For example, the operator may monitor the location and function of the vehicles 100a to 100e for problems or other issues that requires human intervention. If the vehicles 100a to 100e are equipped with cameras, the operator may view picture or video data obtained by the cameras. The operator may also view current GPS data obtained from GPS modules in the vehicles 100a to 100e. Real-time monitoring and control of the vehicles 100a to 100e may, thus, be enabled.

In some embodiments, a human remote operator may also monitor and/or control a vehicle (100a to 100e). The operator may be provided with access, via a client computing device connected to the communications network, to real-time vehicle location, image or video data (e.g. captured by one or more cameras). A human operator may also be able to fully control the vehicle. The control may include directing navigation of the vehicle and unloading sequence.

Inside the warehouse environment 500, the vehicles 100a to 100e may be under manual control of the warehouse worker. The vehicles 100a to 100e may be moved around manually similar to shopping carts by actuating manual controls (such as joysticks 198a and 198b in FIG. 11). Once loaded, the warehouse operator may move the vehicles 100a to 100e outside to a predetermined location and an AI navigation system or human remote operator may then take over navigation of the vehicles 100a to 100e.

FIGS. 15A to 15D are cross-sectional views of the body 102 illustrating an example movement of the first bay door 114a from the closed position to the opened position according to some embodiments. The shape, configuration and movement of bay doors 114a and 114b shown in the drawings are just one example of how bay closing/opening may be accomplished. The skilled person will appreciate that various other configurations may be provided including, but not limited to, one or more sliding doors, movable panels, and the like.

The vehicle body 102 comprises a door actuator mechanism 1502 that is movable to actuate the movement between the closed and opened positions. First pivoting arm 1508 and second pivoting arm 1516 connect the door 114 to the vehicle body 102. In this example, the door actuator mechanism 1502 comprises an actuator body 1504, which moves vertically along a guide 1506 between a lowered position and a raised position, and a third pivoting arm 1518 pivotably coupled to the body 504. The first pivoting arm 1508 interconnects the and the door 114*a* and the actuator mechanism 1502 (via the third pivoting arm 1518). The first pivoting arm 1508 is generally L-shaped in this example, with a pivot connection 1510 to the body 102 at the vertex of the L-shape, a first end pivotably connected to the door 114*a* (at pivot point 1511) and a second end pivotably coupled to the third pivot arm 1518 at pivot point 1512. The third pivoting arm 1518 is pivotably connected at opposite ends to the first pivoting arm 1508 and the actuator body 1504. The second pivoting arm 1516 is pivotably connected at opposite ends 1519 and 1520 to the vehicle body 102 and the door 114*a* respectively as shown. The second pivoting arm 1516 is generally U-shaped.

The first pivoting arm 1508 is driven by the actuator 1502 to rotate about its pivot connection 1510 to the body 102. This rotation causes the door 114*a* to also move in an arc about the pivot connection 1510. The second pivoting arm 1516 controls the angle of the door 114*a* relative to pivot point 1511 throughout the movement of the door 114*a*.

Figure 15A:
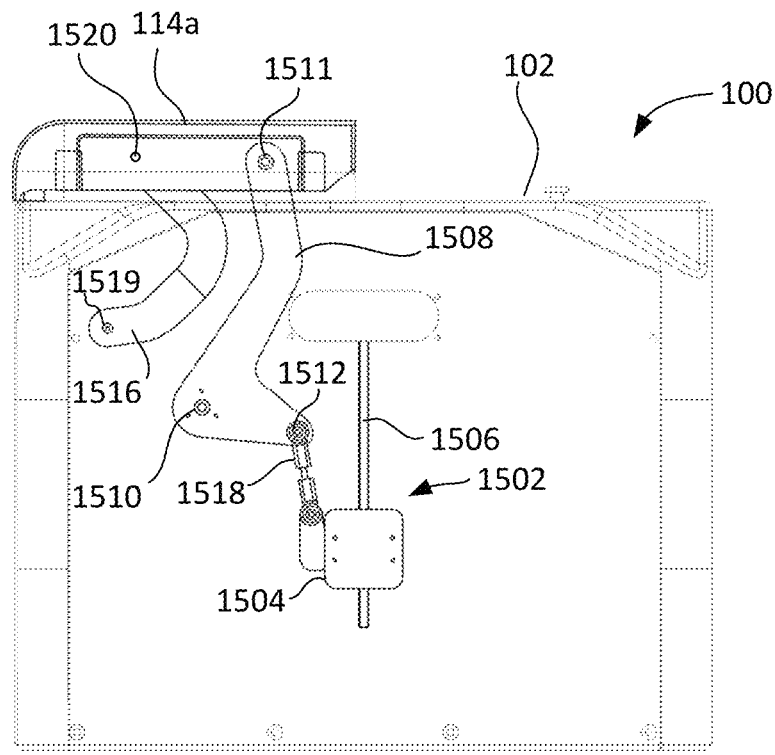
FIGS. 15A to 15D are front cross-sectional views of the vehicle body illustrating movement of the bay doors according to some embodiments.
Figure 15B:
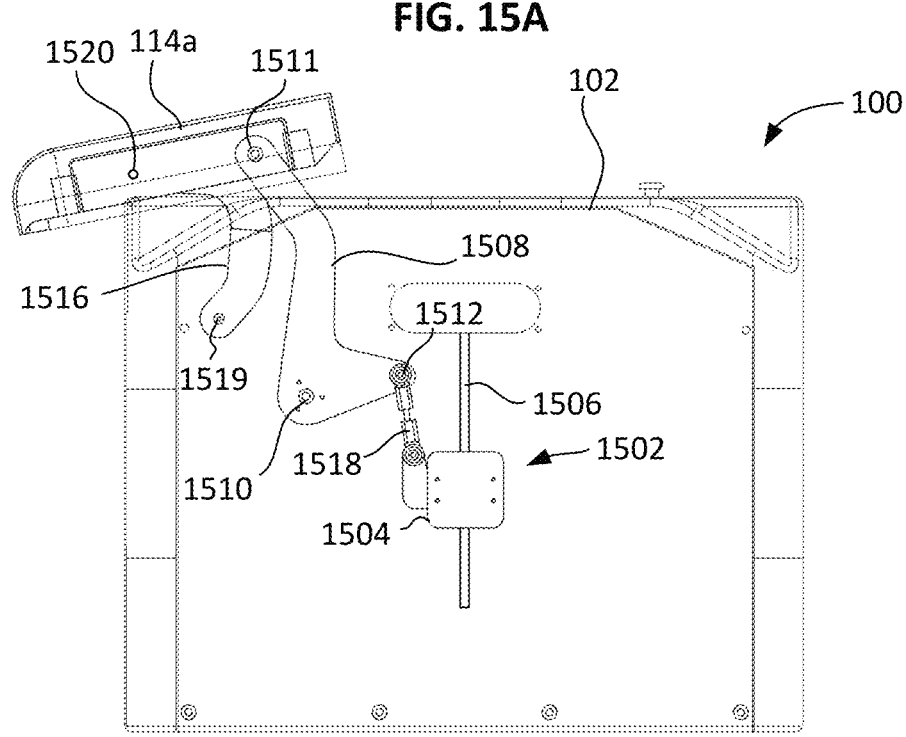
Figure 15C:
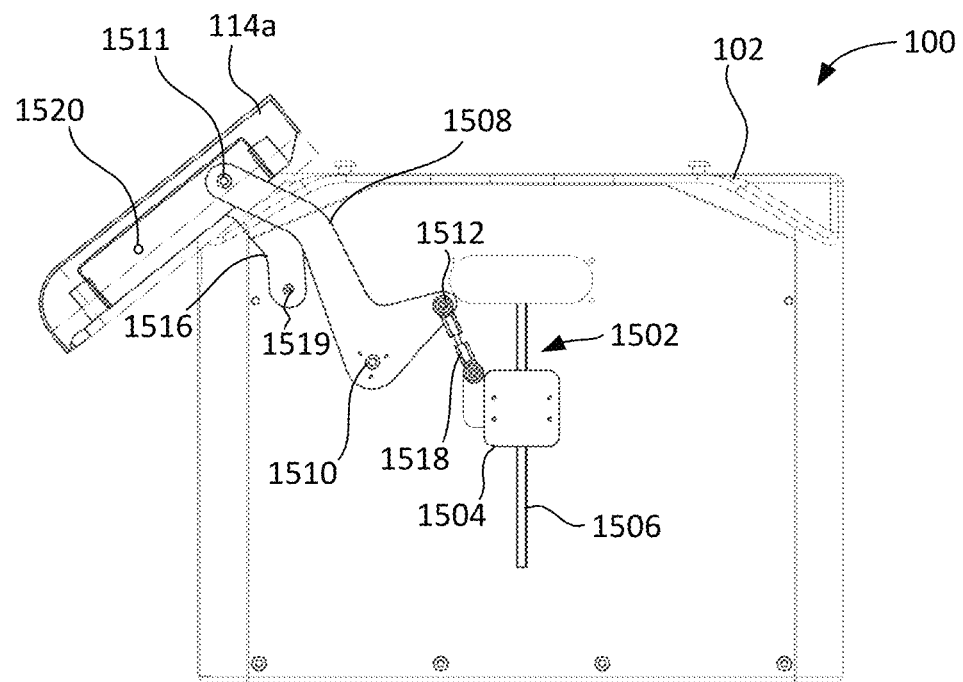
Figure 15D:
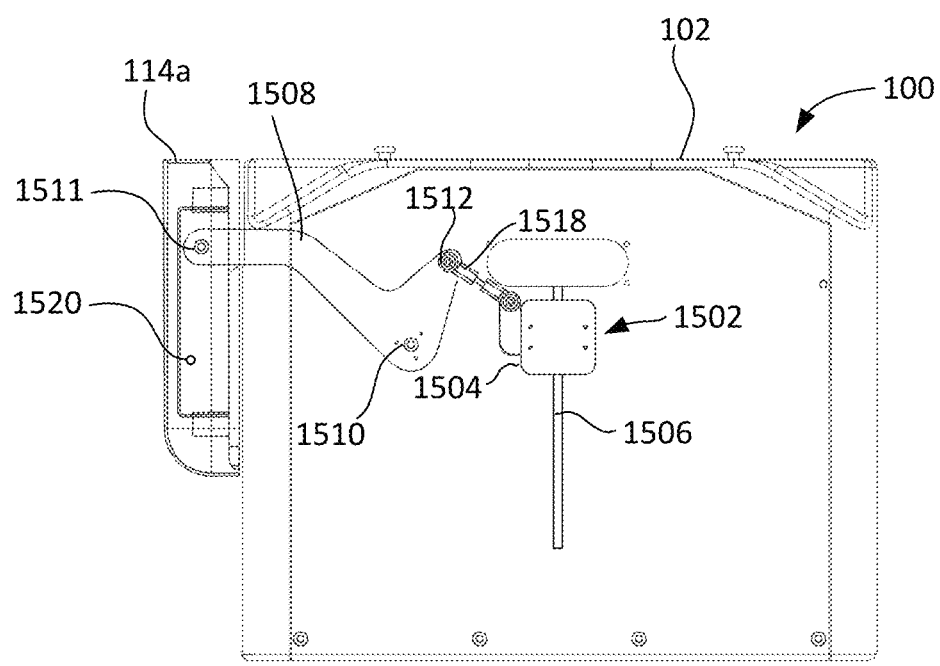

The door 114*a* is shown in the closed position in FIG. 15A. To move the door 114*a* toward the open position, the actuator 1502 is moved up the guide 1506 (by any suitable means, such as an electric motor) to move the door 114*a* from the closed position through the sequence shown in FIGS. 15B to 15D, ending with the opened position shown in FIG. 15D.

The second bay door 114*b* is not shown in FIGS. 15A to 15D, but it is similarly connected to the actuator 1502.

In the closed position, the doors 114*a* and 114*b* are positioned adjacent to each other and cover the top opening 122 of the bay 106. In the opened position, the doors 114*a* and 114*b* are adjacent the sides 132*a* and 132*b* of the body 102 as shown. The doors 114*a* and 114*b* travel in an arcuate path such that they rotate from a horizontally oriented position (when closed), moving downward and outward, to a vertically oriented position (when open). Other door arrangements may be used as well. For example, flexible sliding doors may be provided, where the doors are received vertically into to body 102 when opened.

Figure 16A:
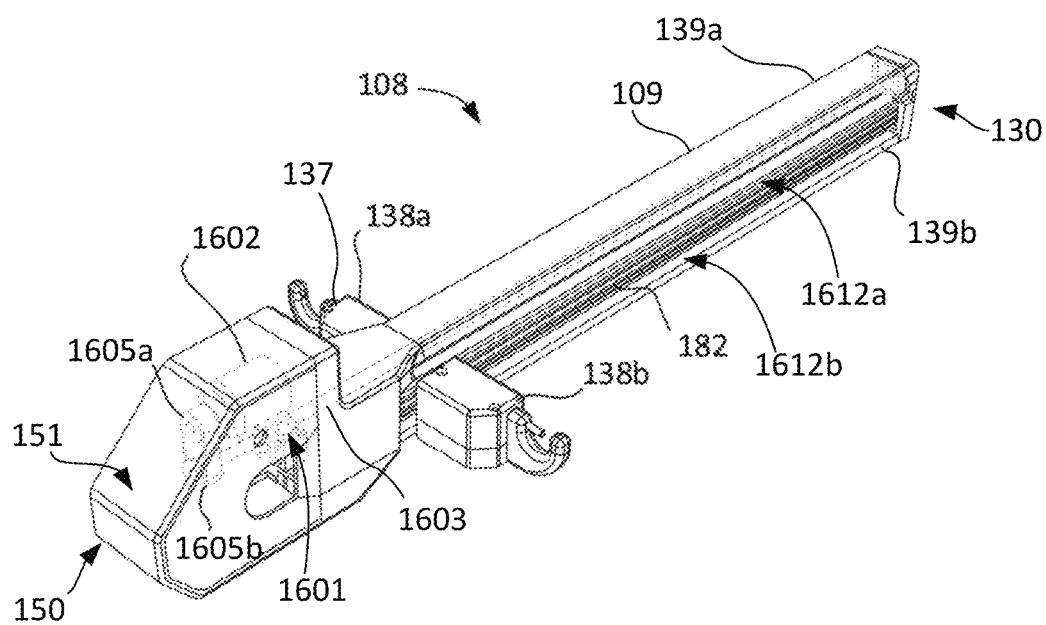
FIG. 16A is a perspective view of the unloading arm of the example vehicle of FIGS. 1 to 6 in isolation.
Figure 16B:
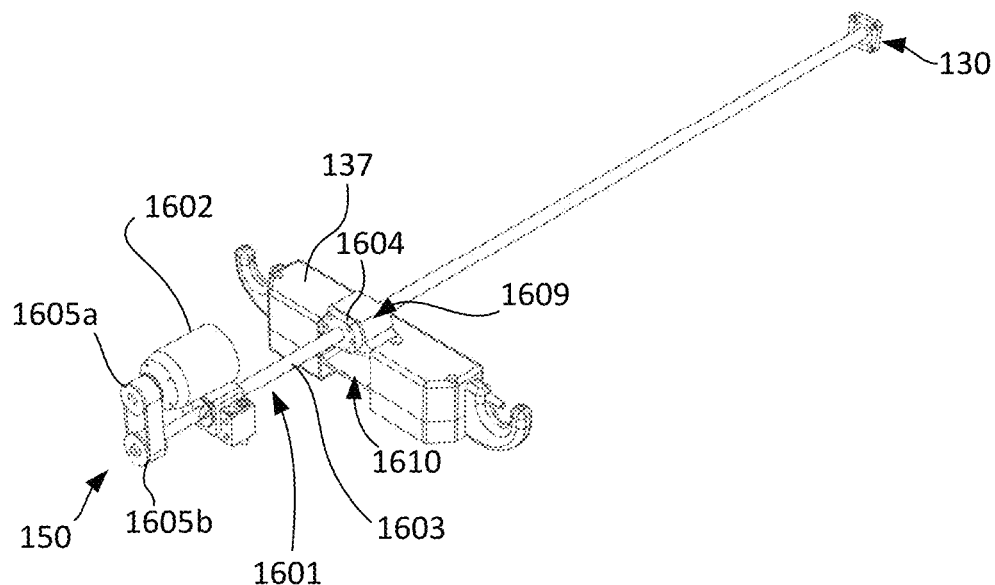
FIG. 16B is a perspective view of a servo motor, a longitudinal actuation mechanism, and hook carriage of the unloading arm in isolation.

FIG. 16A is a perspective view of the unloading arm 108 in isolation illustrating the longitudinal actuation mechanism 1601 and servo motor 1602 (coupled to the longitudinal actuation mechanism 1601) that actuate movement of the hook carriage 137, including arm carriage sections 138*a* and 138*b*, along the guide track 182. FIG. 16B is a perspective view of the and servo motor 1602, the longitudinal actuation mechanism 1601, and the hook carriage 137 in isolation.

The longitudinal actuation mechanism 1601 comprises a ball screw 1603 that substantially and longitudinally extends through the unloading arm 108. The ball screw 1603 is rotatable about its longitudinal axis and is longitudinally fixed relative to the unloading arm. The ball screw 1603 is threaded, though the threading is not shown or visible in FIGS. 16A and 16B. The longitudinal actuation mechanism 1601 also comprises a ball nut 1604 that is engaged with the ball screw 1603 and fixed to the hook carriage 137. The servo motor 1602 rotates the ball screw 1603. In this embodiment, the ball screw 1603 is turned by an electric servo motor 1602. The servo motor 1602 is coupled to the ball screw 1603 by two pulleys 1805*a* and 1805*b* housed in a front/proximal portion 151 of the arm 108. The ball screw 1603 is parallel with the guide track 182 within the arm 108.

Rotation of the ball-screw 1603 actuates movement of the ball nut 1604, and thereby the hook carriage 137, in the longitudinal direction relative to the unloading arm 108. The movement may be toward either end 130 or 150 of the unloading arm 108, with the longitudinal direction of movement determined by the rotational direction of the ball screw 1603.

The hook carriage 137 is slidingly coupled to the guide track 182, such that the guide track 182 may guide and/or stabilize the longitudinal movement along the arm 108.

With reference to FIG. 16B, in this embodiment the hook carriage 137 includes an intermediate portion 1609 between the first and second carriage sections 138*a* and 138*b*, and the intermediate portion 1609 defines a guide passage 1610 therethrough. The guide passage 1610 is aligned with the longitudinal axis of the arm 108 (FIG. 16A). The guide track 182 shown in FIG. 16A is suspended within the arm 108 with upper and lower slots 1612*a* and 1612*b* that extend laterally through the arm 108. The intermediate portion 1609 of the hook carriage 137 is slidably mated with the guide track 182, with the guide track 182 extending through and slidably engaged with the guide passage 1610. The slots 1612*a* and 1612*b* provide clearance for longitudinal sliding movement of the hook carriage 137.

Methods for slidably engaging the carriage or other hook components to an unloading arm may vary in other embodiments. Additionally, the longitudinal actuation mechanism for actuating longitudinal movement may vary in other embodiments. For example, a belt drive, chain and sprocket, or other methods may be used.

FIGS. 17 to 20 illustrate additional embodiments of automated delivery vehicles 1700, 1800 and 1900. The vehicles 1700, 1800 and 1900 may be at least partially automated. These examples are generally similar to the vehicle 100 shown in FIGS. 1 to 6, with some differences or modifications discussed below.

Figure 17:
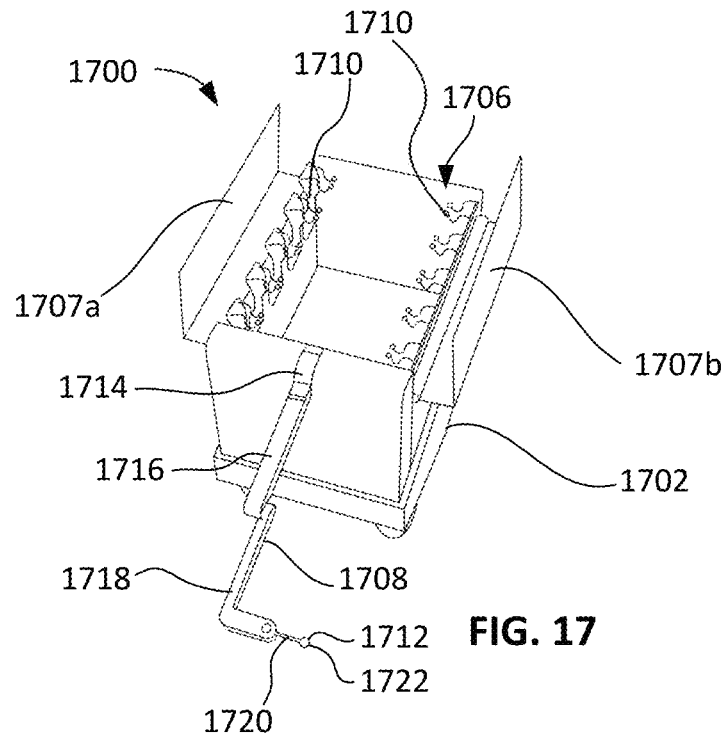
FIG. 17 is a perspective view of another example embodiment of a delivery vehicle.

FIG. 17 is a perspective view of another embodiment of a delivery vehicle 1700. The vehicle 1700 in FIG. 17 includes an unloading arm 1708 for unloading containers from a bay 1706. The bay includes doors 1707*a* and 1707*b* and hangers 1710. The doors 1707*a* and 1707*b* are shown in an example opened position in FIG. 18. The hangers 1710 in this embodiment rotate between lowered and raised positions. The lowered position may provide sufficient clearance for the arm 1708 to not engage the hanger 1710. The raised position may move a hanger 1710 into lateral alignment with a container carrying member 1712 of the arm 1708.

The arm 1708 in this example includes a first section 1714, a second section 1716, a third section 1718, and the container carrying member 1712. The second section 1716 interconnects the first and third sections 1714 and 1718. The first section is pivotably coupled to the body 1702 of the vehicle 1700 at one end and pivotably connected to the second section 1716 at its other end. The second section 1716 is axially rotatable about its own longitudinal axis. The third section 1718 is L-shaped and pivotably coupled to the second section 1716. The first and third sections 1714 and 1718 pivotably rotate in a vertical plane. This configuration allows the arm 1708 as a whole to rotate in and out of the bay 1706, and for the carrying member 1712 to be moved to positions along the length of the bay 1706 to align with selected hangers 1710. Axial rotation of the second section 1716 allows the arm to selectively move the carrying member from row of hangers 1710 to the other for engaging and lifting a container off any one of hangers 1710. The container carrying member 1712 in this example is in the form of a rod 1720 with a ball 1722 at a distal end thereof. The carrying member may be in the form of a hook in other embodiments.

Figure 18:
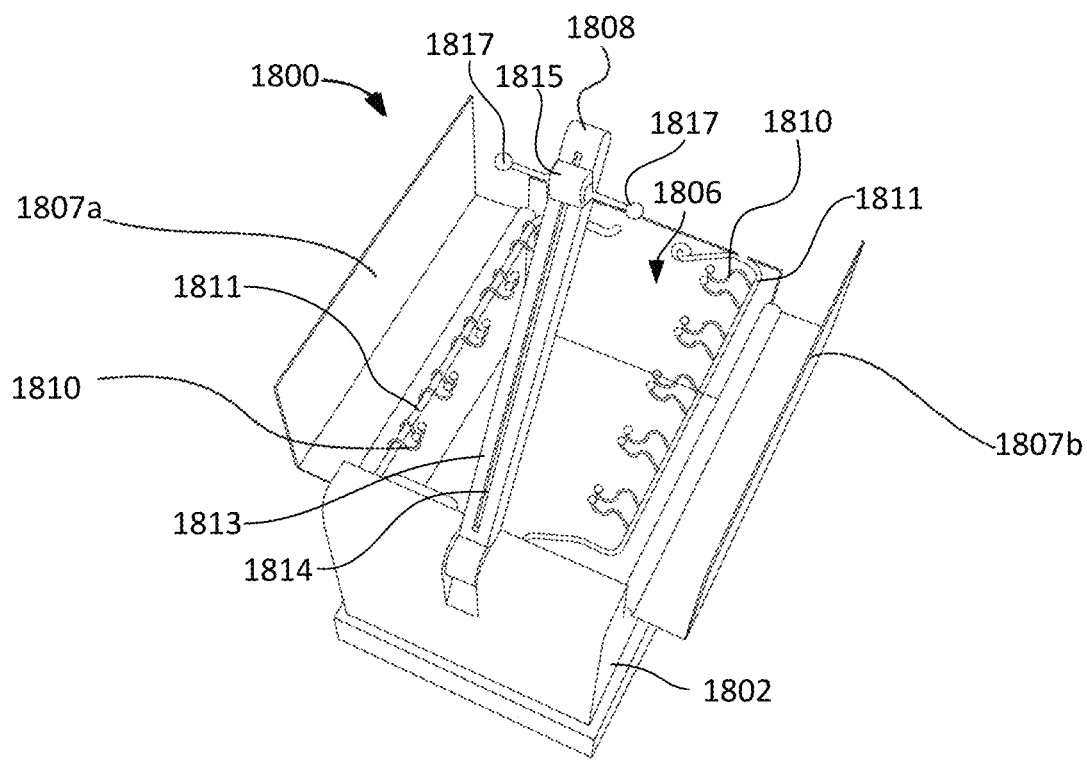
FIG. 18 is a perspective view of another example embodiment of a delivery vehicle.

FIG. 18 is a perspective view of another embodiment of an automated delivery vehicle 1800. The vehicle 1800 in FIG. 18 includes an unloading arm 1808 for unloading containers from a bay 1806. The bay includes top doors 1807a and 1807b and hangers 1810. The doors 1807a and 1807b are shown in an example opened position in FIG. 18. The hangers 1810 in this embodiment are arranged in rows on two frames 1811 near opposite sides of the bay 1806. The frames 1811 are selectively moved (by mechanical power source, such as a motor) between lowered and raised positions. The lowered position may provide sufficient clearance for the arm 1808 to not engage the hanger 1810. The raised position may move a hanger 1810 into lateral alignment with a container carrying member 1812 of the arm 1808.

The unloading arm 1808 in this example is in the form of a pivoting elongate member similar to the arm 108 in FIG. 1. In this example, however, a guide track 1814 runs along a face 1813 of the arm that faces upward when the arm is in the retracted position (within the bay 1806). A container engagement module 1815 is seated in the track 1814 and is actuatable (e.g. by a motor) for longitudinal movement along the track 1814. The engagement module 1815 includes two carrying members 1817 that are each in rod/ball form similar to the example of FIG. 17. However, other carrying members such as hooks may be used in other embodiments. The engagement module 1815 is movable to position the carrying members 1817 for selectively engaging each longitudinally aligned pair of hangers 1710 of the two frames 1711.

Figure 19:
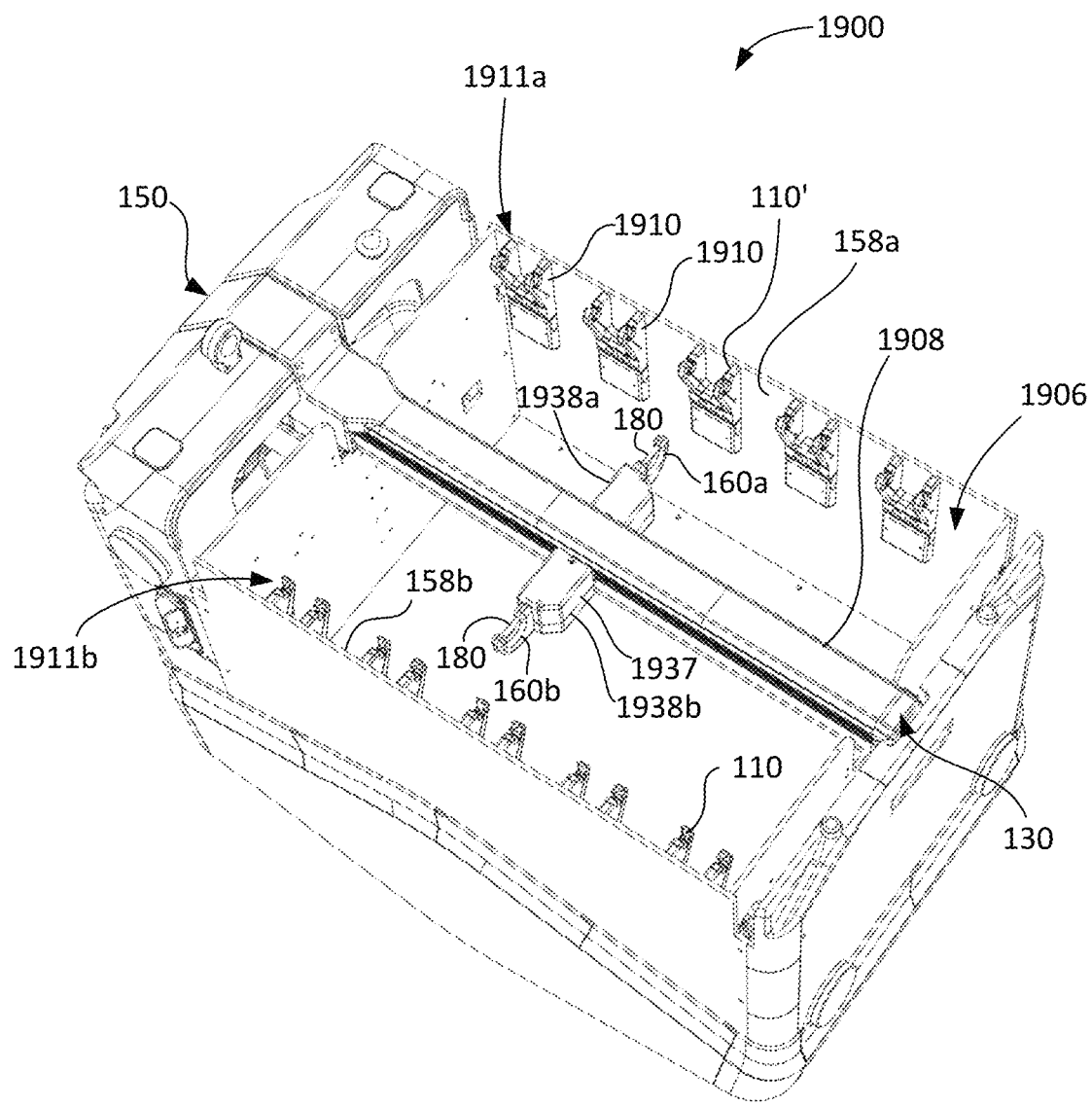
FIGS. 19 and 20 are upper perspective views of yet another embodiment of a delivery vehicle.
Figure 20:
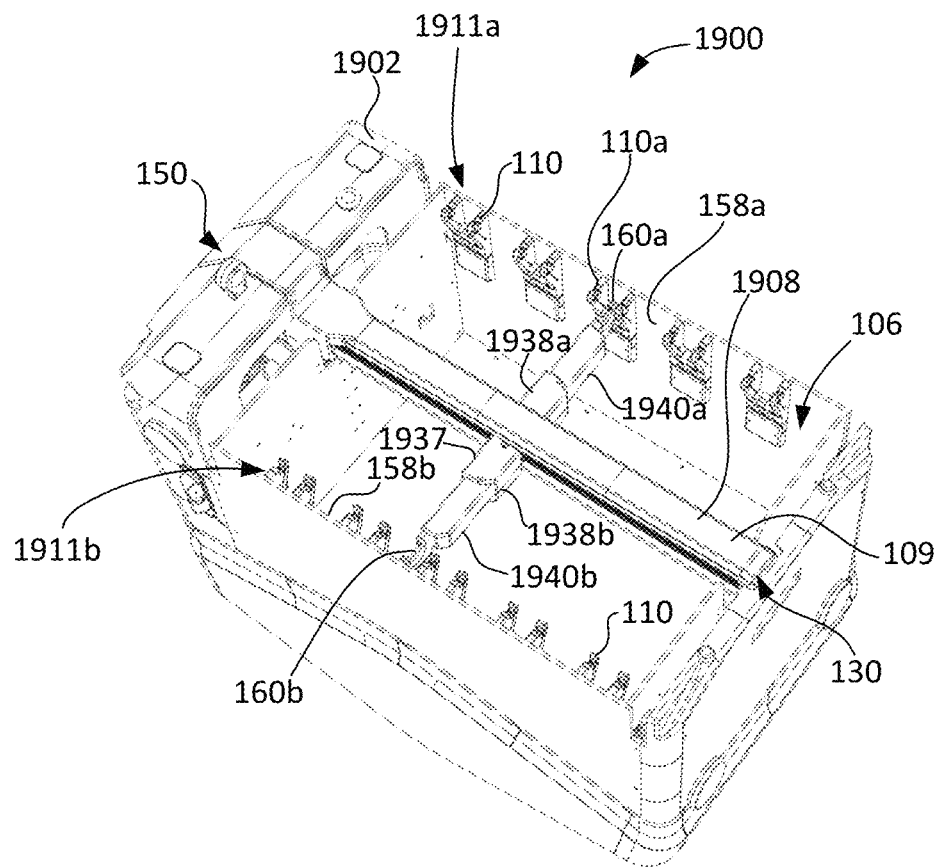

FIGS. 19 and 20 are upper perspective views of yet another embodiment of an automated delivery vehicle 1900. In FIGS. 19 and 20 bay doors removed to show elements in the bay 106. The vehicle 1900 in FIG. 19 includes an unloading arm 1908 and hangers 110. The vehicle 1900 is similar to the embodiment shown in FIGS. 1 to 6, with like reference numbers indicating like elements. The vehicle 1900 includes a vehicle body 1902 comprising a bay 106. The vehicle 1900 further comprises an unloading arm 1908 including an arm member 109 and hook carriage 1937 movably mounted on the arm member 109. The hook carriage 1937 includes carriage sections 1938a and 1938b on opposite sides of the unloading arm 1908. The carriage sections 1938a and 1938b each include a respective hook (160a, 160b) for engaging containers (not shown) on hangers 110 on the corresponding side of the bay 1906. However, in this example, in addition to being longitudinally movable along the arm 1908, the carriage sections 1938a and 1938b are adjustable to move the hooks in the lateral direction towards and away from the hangers 110. Specifically, in this example, the carriage sections 1938a and 1938b extend and retract in the lateral direction (i.e. moving toward and away from sides of the bay 1906). Additionally, since the hooks 160a and 160b are laterally adjustable, there is no need for the hangers to be moved laterally to align with the hooks 160a and 160b. Thus, the hangers 110 are secured to the inner sides 158a and 158b of the bay 1906 and do not move in this example embodiment. Rather, the carriage sections 1938a and 1938b extend to laterally align with the stationary hangers 110.

FIG. 19 shows the carriage sections 1938a and 1938b in the retracted position. FIG. 20 shows the carriage sections in the extended position and laterally and longitudinally aligned for picking up a container from one or both of a pair of hangers 110.

In some embodiments, the carriage sections 1938a and 1938b may be configured to both extend and both retract together, which may simplify the mechanical actuating system for the extension/retraction. In order to allow hangers to be individually selected (one at a time) in this configuration, the two rows 1911a and 1911b of hangers 110 (on opposite sides of the bay) may be longitudinally offset from each other as shown in FIGS. 19 and 20. As an example, FIG. 20 shows first carriage section 1938a longitudinally aligned with one hanger 110' of row 1911a, while second carriage section 1938b is not aligned with any hanger of row 1911b. In this example embodiment, the pins 180 may be fixed and may be automatically extended to be "closed" when the carriage sections 1938a and 1938b are retracted (FIG. 1), and the pins 180 may be automatically "opened" when the carriage sections 1938a and 1938b are extended (FIG. 2).

The carriage sections 1938a and 1938b are each laterally extendable/retractable by means of a respective telescoping actuator mechanism 1940a and 1940b (shown in FIG. 20), which may be driven by a motor or any other suitable source of mechanical power. Any suitable method for actuating the extending and retracting movement may be used. For example, the lateral extension/retraction may be implemented using one or more of: levers, cable, angled channels, or other mechanisms.

Similar to the embodiment of FIGS. 1 to 6, hook carriage 1937 may be motor-driven to travel longitudinally along the arm 1908. The arm 1908 may include a motor and ball screw mechanism (not shown in FIG. 19 or 20) for longitudinal adjustment of the hook carriage 1937, similar to the embodiment of FIG. 16. The retraction and extension of the carriage sections 1938a and 1938b may be driven by rotation of the ball screw. Rotation of the ball screw in a first rotation direction may retract the carriage sections 1938a and 1938. When full retraction is reached, continued rotation of the ball screw in the first rotation direction may move the carriage 1937 in a first longitudinal direction (e.g. toward distal end 130 of the arm 1908). Rotation of the ball screw in a second, opposite rotation direction may extend the carriage sections 1938a and 1938b. When full extension is reached, continued rotation of the ball screw in the second rotation direction may move the carriage 1937 in a second, opposite longitudinal direction (e.g. toward proximal end 150 of the arm 1908). In this embodiment, in order to unload a container (e.g. a bag) from a selected one of the hangers 110, the following example sequence may be followed:

(1) The hook carriage 1937 may start in a default position near the proximal end 150 of the arm 1908.

(2) The motor may turn the ball screw in a first rotation direction to cause first the carriage sections 1938a and 1938b to be retracted.

(3) When the hooks 160a and 160b have reached the maximum retraction, continued rotation of the ball screw in the same direction causes the carriage 1937 to start moving in the longitudinal direction toward distal end 130 of the arm 1908.

(4) When longitudinal alignment of the corresponding carriage section 1938a or 1938b with the selected hanger 110 has been achieved, the motor may reverse rotation of the ball screw. The ball screw may be rotated in the second, reverse direction for the amount needed to extend the carriage sections 1938a and 1938b to laterally align with the selected hanger 110, but without moving the carriage 1937 in the longitudinal direction. The extension of the carriage sections 1938a and 1938b, in this example, also automatically causes the pins 180 to retract, thereby opening the hooks 160a and 160b.

(5) The arm 1908 may then rotate (initially upward) a predetermined amount to lift and unseat the container from the selected hanger 110.

(6) The motor may again turn the ball screw in the first rotation direction to cause first the carriage sections 1938a and 1938b to be retracted, and the pins 180 may extend to secure the container in the corresponding arm hook 160a or 160b.

(7) When the hooks 160a and 160b reach the maximum retraction, continued rotation of the ball screw in the first rotation direction causes the carriage 1937 to begin moving in the direction toward distal end 130 of the arm 1908. The carriage 1937 may be moved in that direction until the maximum distal position of the carriage 1937 is reached (at or near the distal end 130).

(8) The arm 1908 may continue rotation move the arm 1908 forward of the vehicle into an extended position (i.e. to the extended position of the arm, similar to FIG. 9G). This rotation may continue until the container touches the ground in the front of the vehicle 1900.

(9) The motor may rotate the ball screw in the second, reverse direction, thereby causing the carriage sections 1938a and 1938b to extend. This may also open the hooks 160a and 160b by retracting pins 180 to release the bag; and

(10) When the bag is released, the carriage 1937 may be returned to the proximal-most position along the arm 1908, and the arm 1908 may rotate back into its retracted position in the bay 1906 (similar to FIG. 9A).

Figure 21:
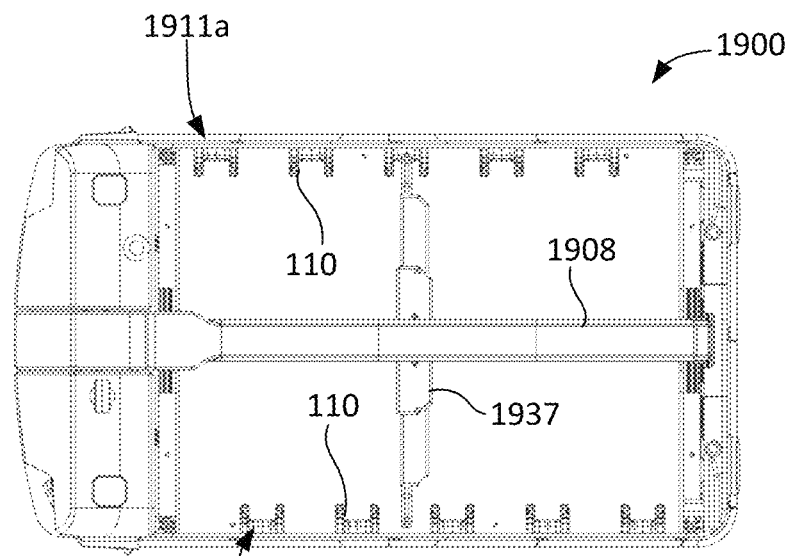
FIG. 21 is a top view of the vehicle of FIGS. 19 and 20.

FIG. 21 is a top view of the vehicle 1900 of FIGS. 19 and 20 with the hook carriage 1937 of the unloading arm 1908 in the extended position of FIG. 20. Bay doors are removed in FIG. 21 to illustrate elements in the bay 106, also described above. FIG. 21 shows the rows 1911a and 1911b in with the hangers 110 the staggered (longitudinally offset rows) configuration.

In each of the embodiments shown in FIGS. 17 to 21, the delivery vehicle 1700, 1800 or 1900 may include a control system for controlling navigation and unloading movement of the arm 1708, 1808 or 1908, similar to the vehicle 100 in FIGS. 1 to 6. The control system may be customized for controlling the particular embodiments of the unloading arm 1708, 1808 or 1908 shown. For the embodiment of FIGS. 17 and 18, the control system may further control raising and lowering of the hangers 1710 and 1810. For the embodiment of FIG. 19, the control system may control extension/retraction of the carriage sections 1938a and 1938b.

Figure 22:
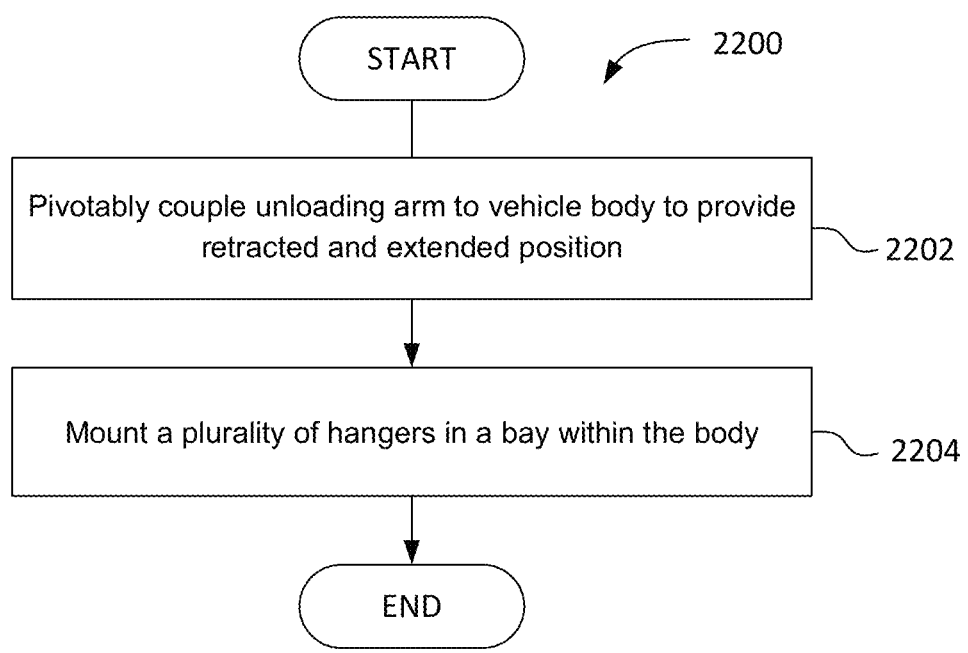
FIG. 22 is a flowchart of an example method for a delivery vehicle according to some embodiments.

FIG. 22 is a flowchart of a method 2200 for a delivery vehicle comprising body and a bay within the body, according to some embodiments. The vehicle body may be in the form of any of the example bodies (102, 1702, or 1802) described herein. At block 2202, an unloading arm is pivotably coupled to the vehicle body such that the unloading arm is rotatable between a retracted arm position and an extended arm position. The unloading arm may be at least partially received in the bay in the retracted arm position and extend from the body in the extended arm position. The unloading arm may be in the form of any of the example unloading arms (108, 1708, 1808 or 1908) described herein. The unloading arm may be pivotably coupled to rotate in a vertical plane.

At block 2204, a plurality of hangers are mounted in the bay. The hangers may be positioned parallel to the unloading arm when the unloading arm is in the retracted arm position, for example. The hangers may be in the form of the any of the hangers (110, 1710 or 1810) described herein. The hanger may, for example, be mounted on laterally movable frames. In other embodiments, the hangers may be mounted in fixed positions in the bay (e.g. on walls of the bay). The unloading arm comprises at least one container carrying member (e.g. at least one arm hook) longitudinally movable along the unloading arm for selective longitudinal alignment with each of the plurality of hangers. At least one container carrying member may be carried on a carriage that is longitudinally movable along the arm. The carriage may laterally extend and retract to laterally align the at least one container carrying member with the hangers.

Figure 23:
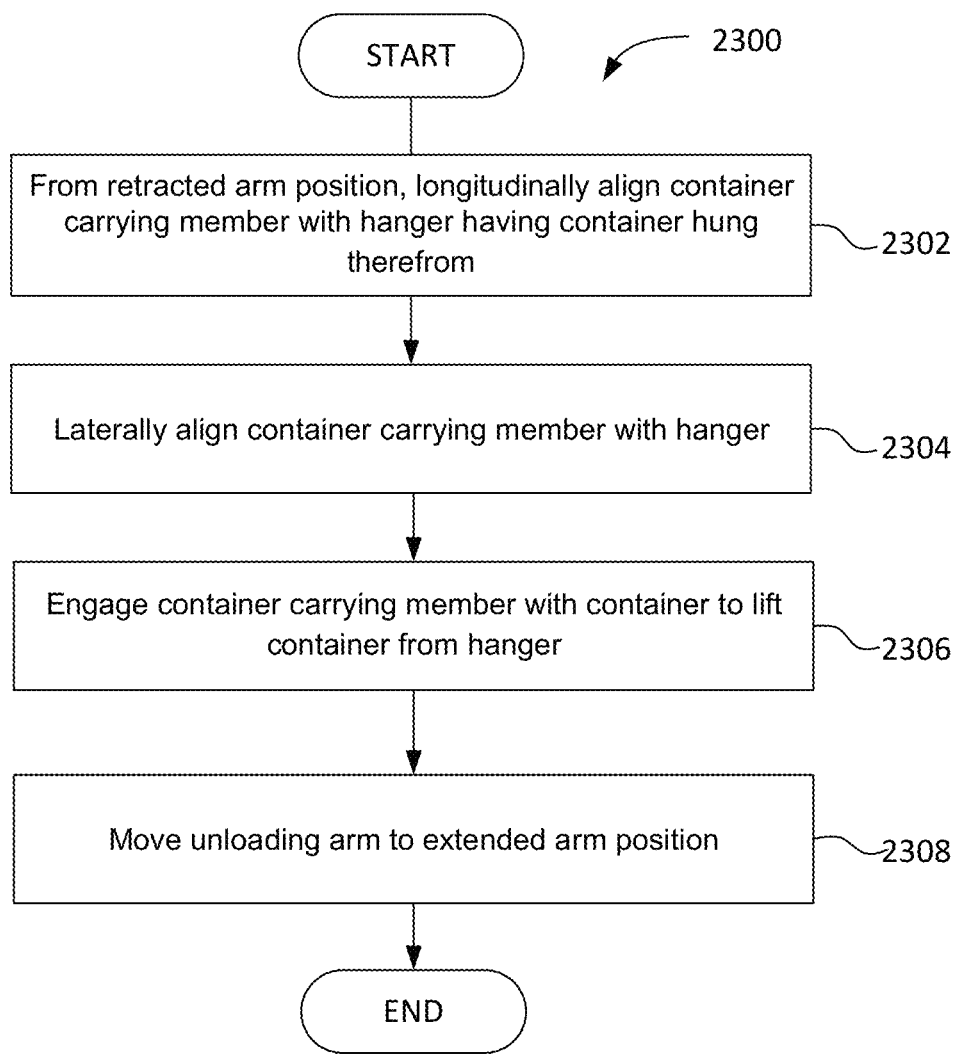
FIG. 23 is a flowchart of an example method for unloading a container from a delivery vehicle according to some embodiments.

FIG. 23 is a flowchart of an example method 2300 for unloading a container by a delivery vehicle, according to some embodiments. The container is hung from one of a plurality of hangers within the body of the vehicle. The vehicle may be in the form of any of the vehicles (100, 1700, 1800 or 1900) described herein comprising an unloading arm including at least one container carrying member and hangers mounted within a bay of the vehicle. The unloading arm includes at least one container carrying member that is longitudinally adjustable along of the arm.

At block 2302, starting from a retracted position of the unloading arm, a container carrying member of the arm moved to be longitudinally aligned with a selected hanger from which the container is hung. This may comprise movement of a carriage (e.g. hook carriage 137 of FIG. 5) in the longitudinal direction along the arm.

At block 2304, the container carrying member is laterally aligned with the selected hanger. This lateral alignment may comprise moving the hanger (e.g. via a movable hanger frame). Alternatively, a carriage to which the container carrying member is mounted may extend laterally toward the hanger.

At block 2306, the container carrying member engages the container to lift the container from hanger. This may comprise rotating the unloading arm upward, initially, in a vertical plane about a pivot axis. In some embodiments, the container carrying member is a hook. A container securing mechanism such an extendable/retractable pin may be utilized to secure the container in the hook.

At block 2308, the unloading arm is moved to an extended position. This may comprise continuing rotating the unloading arm to a position forward of the vehicle, possibly with the container touching or near the ground in front of the vehicle. The method may also comprise, before or concurrent with the continued rotation to the extended arm position, moving the container carrying member (e.g. hook) to a distal-most position on the unloading arm.

The method may further comprise releasing the container from the container carrying member. For example, the container securing mechanism maybe disengaged to release the container. In the case of an extendable/retractable pin (such as pin 180 in FIG. 5), this disengagement may comprise retracting the pin to release the container. The method may further comprise returning the unloading arm to the retracted arm position after the container has been unloaded.

Figure 24:
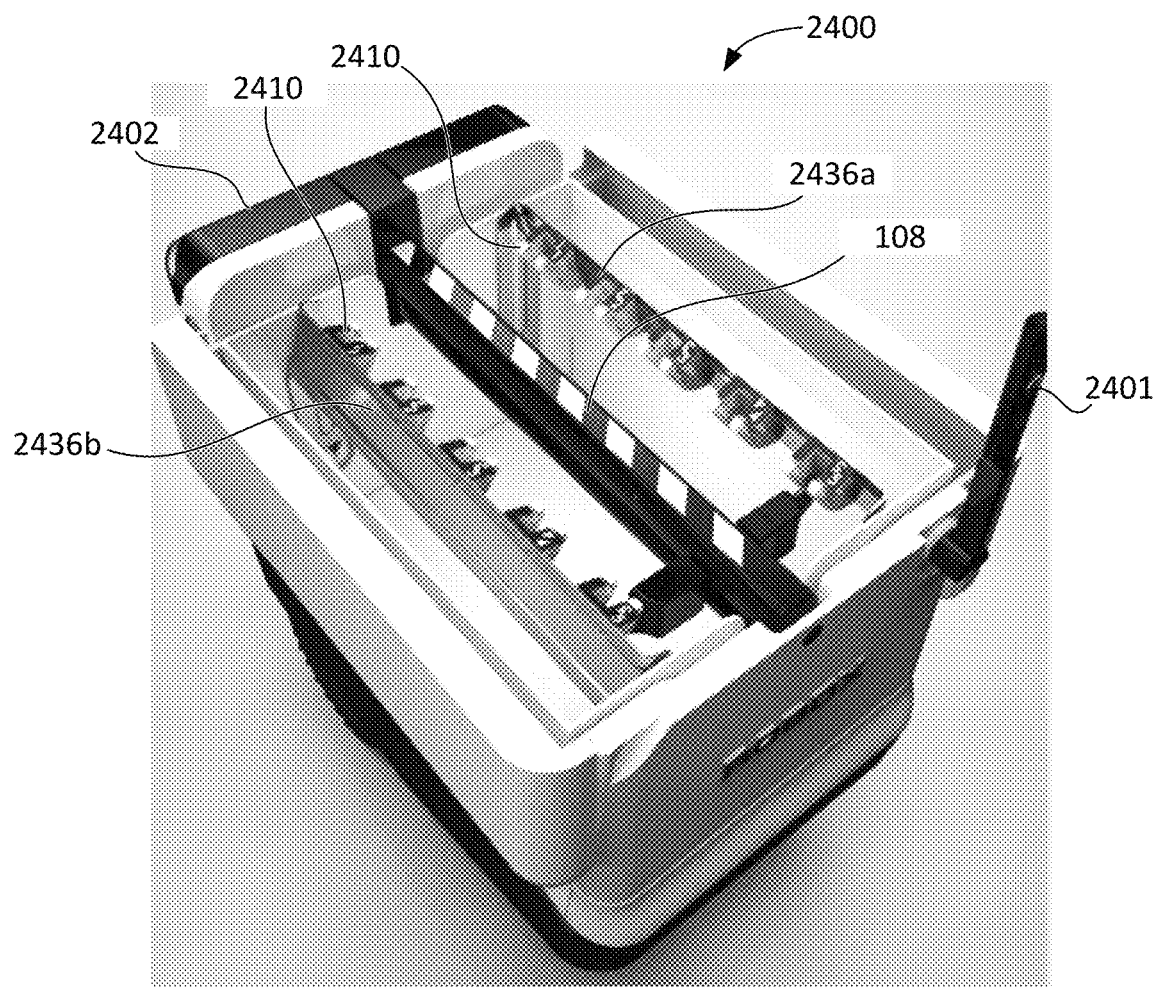
FIG. 24 is an upper perspective view of yet another example vehicle according to some embodiments.

FIG. 24 is a perspective view of yet another example vehicle 2400. This vehicle 2400 is similar to the vehicle 100 in FIGS. 1 to 6, with a body 2408 and a similar unloading arm 108. However, this embodiment omits RFID readers and includes an additional flagpole 144 is also shown. The flagpole 144 may have a light, possibly flashing, to increase visibility and conspicuousness of the vehicle 2400. The hanger frames 2436a and 2436b with hangers 2410 thereon are also shown.

It is to be understood that a combination of more than one of the embodiments described above may be implemented. Embodiments are not limited to any particular one or more of the approaches, methods or apparatuses disclosed herein. One skilled in the art will appreciate that variations, alterations of the embodiments described herein may be made in various implementations without departing from the scope of the disclosure.

We claim:

1. A delivery vehicle comprising:
   a vehicle body, the vehicle body comprising a bay therein;
   a plurality of container hangers mounted within the bay;
   an unloading arm movable between a retracted arm position and an extended arm position, the unloading arm being at least partially received in the bay in the retracted arm position and extending from the vehicle body in the extended arm position; and
   the unloading arm comprising at least one container carrying member longitudinally movable along the unloading arm for selective longitudinal alignment with each of the plurality of container hangers,
   wherein the unloading arm is pivotably connected to the vehicle body of the vehicle and rotates about a pivot axis between the retracted arm position and the extended arm position, and the unloading arm rotates in a vertical plane between the retracted arm position and the extended arm position.

2. The vehicle of claim 1, wherein the at least one container carrying member comprises at least one hook for engaging and lifting a container hung from one of the one or more hangers.

3. The vehicle of claim 2, wherein the unloading arm comprises an arm member and a hook carriage mounted on the arm member and longitudinally movable along the arm member, and the at least one hook extends from the hook carriage.

4. The vehicle of claim 3, further comprising a longitudinal actuation mechanism coupled to the hook carriage, the longitudinal actuation mechanism actuating longitudinal movement of the hook carriage along the arm member.

5. The vehicle of claim 4, wherein the longitudinal actuation mechanism comprises a ball screw mechanism.

6. The vehicle of claim 3, wherein the hook carriage comprises first and second carriage sections, each carriage section being positioned on a respective side of the unloading arm, the at least one hook comprising a first hook extending from the first carriage section and a second hook extending from the second carriage section.

7. The vehicle of claim 6, wherein each carriage section comprises a respective extendable and retractable pin, and the pin, when extended, extends across a gap defined by the respective hook.

8. The vehicle of claim 6, wherein the plurality of container hangers is arranged in first and second rows of hangers, and when the unloading arm is in the retracted arm position: the unloading arm extends between the first and second rows of hangers; and the first and second rows of hangers are each substantially parallel to the unloading arm, with each row positioned to a respective side of the unloading arm.

9. The vehicle of claim 8, wherein the first row of hangers are mounted on a first hanger frame and the second row of hangers is mounted on a second hanger frame, each of the first and second hanger frames being movable between a first frame position and a second frame position.

10. The vehicle of claim 9, wherein, for each of the first and second hanger frames, the first frame position laterally aligns the container hangers on the hanger frame with the respective hook of the carriage section on the respective side of the unloading arm, and the second frame position provides clearance for longitudinal movement of the hook carriage.

11. The vehicle of claim 8, wherein the first and second carriage sections are each laterally extendable and retractable, the first carriage section extending to laterally align the first hook with the container hangers of the first row, and the second carriage section extending to laterally align the second hook with the container hangers of the second row, and wherein the first row of hangers is mounted on a first sidewall of the bay, and the second row of hangers is mounted on a second sidewall of the bay.

12. The vehicle of claim 1, further comprising bay doors movable between closed and opened positions, wherein, in the closed position, the bay doors cover an upper opening of the bay, and in the opened position, the bay doors are positioned adjacent sides of the vehicle body.

13. The vehicle of claim 1, further comprising at least one electronic identification reader for reading an electronic identification device.

14. The vehicle of claim 13, wherein the at least one electronic identification reader comprises a plurality of readers, each reader associated with a respective one of the plurality of container hangers.

15. The vehicle of claim 1, further comprising a wireless communication module for communication with a remote computing device over a wireless communication network.

16. The vehicle of claim 1, further comprising a plurality of motor-driven wheels and a control system operative to control at least one of: the unloading arm; and the wheels.

17. The vehicle of claim 1, further comprising, for each container carrying member, a container retaining mechanism operable to releasably secure a container to the container carrying member.

18. A system comprising:
    at least one delivery vehicle, each comprising:
        a respective vehicle body, the vehicle body comprising a bay therein;
        a respective plurality of container hangers mounted within the bay;
        a respective unloading arm movable between a retracted arm position and an extended arm position, the unloading arm being at least partially received in the bay in the retracted arm position and extending from the vehicle body in the extended arm position, wherein the unloading arm comprises at least one container carrying member longitudinally movable along the unloading arm for selective longitudinal alignment with each of the plurality of container hangers, and wherein the unloading arm is pivotably connected to the vehicle body of the vehicle and rotates about a pivot axis between the retracted arm position and the extended arm position, and the unloading arm rotates in a vertical plane between the retracted arm position and the extended arm position; and
    at least one remote computing device in communication with the at least one vehicle, wherein the at least one remote computing device sends signals to the vehicle to control at least one of navigation and unloading of the vehicle.

19. A method for a delivery vehicle comprising a vehicle body and a bay within the body, the method comprising:
    pivotably connecting an unloading arm to the vehicle body such that the unloading arm is rotatable about a pivot axis and in a vertical plane between a retracted arm position and an extended arm position, the unloading arm being at least partially received in the bay in the retracted arm position and extending from the body in the extended arm position; and mounting a plurality of hangers in the bay,
wherein the unloading arm comprises at least one container carrying member longitudinally movable along the unloading arm for selective longitudinal alignment with each of the plurality of hangers.

\* \* \* \* \*